US012585550B1

(12) United States Patent
Bharadwaj et al.

(10) Patent No.: US 12,585,550 B1
(45) Date of Patent: *Mar. 24, 2026

(54) METHODS AND SYSTEMS FOR IMPROVED BACKUP PERFORMANCE

(71) Applicant: Veritas Technologies LLC, Santa Clara, CA (US)

(72) Inventors: Vaijayanti Rakshit Bharadwaj, Pune (IN); Chirag Dalal, Pune (IN)

(73) Assignee: Cohesity, Inc., Santa Clara, CA (US)

( * ) Notice: Subject to any disclaimer, the term of this patent is extended or adjusted under 35 U.S.C. 154(b) by 139 days.

This patent is subject to a terminal disclaimer.

(21) Appl. No.: 18/240,786

(22) Filed: Aug. 31, 2023

Related U.S. Application Data

(63) Continuation of application No. 17/459,612, filed on Aug. 27, 2021, now Pat. No. 11,775,396.

(60) Provisional application No. 63/236,552, filed on Aug. 24, 2021.

(51) Int. Cl.
G06F 11/00 (2006.01)
G06F 11/1446 (2026.01)
G06F 11/1471 (2026.01)

(52) U.S. Cl.
CPC ...... G06F 11/1464 (2013.01); G06F 11/1451 (2013.01); G06F 11/1469 (2013.01); G06F 11/1471 (2013.01)

(58) Field of Classification Search
CPC ............. G06F 11/1464; G06F 11/1451; G06F 11/1469; G06F 11/1471
See application file for complete search history.

(56) References Cited

U.S. PATENT DOCUMENTS

| | | | | |
|---|---|---|---|---|
| 8,504,529 B1 * | 8/2013 | Zheng | ................. | G06F 11/1469 |
| | | | | 707/686 |
| 8,621,165 B1 * | 12/2013 | Sridharan | ........... | G06F 11/1471 |
| | | | | 707/649 |
| 9,916,207 B2 * | 3/2018 | Oberhofer | ............... | G06F 3/061 |
| 9,959,179 B1 * | 5/2018 | Yu | ........................ | G06F 11/1469 |
| 10,031,816 B2 * | 7/2018 | Liu | ..................... | G06F 11/1451 |
| 10,146,630 B1 * | 12/2018 | Kumar | ................ | G06F 16/2237 |
| 11,675,501 B2 * | 6/2023 | Gade | .................... | G06F 3/0653 |
| | | | | 711/156 |

(Continued)

*Primary Examiner* — Loan L.T. Truong
(74) *Attorney, Agent, or Firm* — Greenberg Traurig, LLP

(57) ABSTRACT

Methods, computer program products, computer systems, and the like for improved performance, when verifying backup images, are disclosed, which can include generating representational information (where the representational information is based, at least in part, on at least a portion of information of a top-level entity), retrieving a stored representational information (where the stored representational information is based, at least in part, on the at least the portion of the information of the top-level entity, the stored representational information is retrieved from log information produced as part of a backup operation, and the backup operation produced a backup image of the top-level entity), determining whether the representational information and the stored representational information match, and, in response to a determination that the representational information and the stored representational information do not match, indicating that the backup image of the top-level entity is corrupt.

20 Claims, 17 Drawing Sheets

(56)          References Cited

U.S. PATENT DOCUMENTS

| | | | |
|---|---|---|---|
| 2004/0139128 A1* | 7/2004 | Becker ................ | G06F 11/1456 |
| | | | 714/E11.12 |
| 2006/0004846 A1* | 1/2006 | Murley ............... | G06F 11/1451 |
| 2010/0262585 A1* | 10/2010 | Rosikiewicz ....... | G06F 11/1469 |
| | | | 707/679 |
| 2011/0208928 A1* | 8/2011 | Chandra ............ | G06F 11/1466 |
| | | | 711/E12.001 |
| 2012/0233417 A1* | 9/2012 | Kalach ................ | G06F 11/1453 |
| | | | 711/E12.103 |
| 2012/0254126 A1* | 10/2012 | Mitra ................... | G06F 16/128 |
| | | | 707/687 |

* cited by examiner

TLE Data Segment Backup Process
900

Incremental Backup Tracklog Example
1100

Deduplication Store
Integrity Verification Process
1300

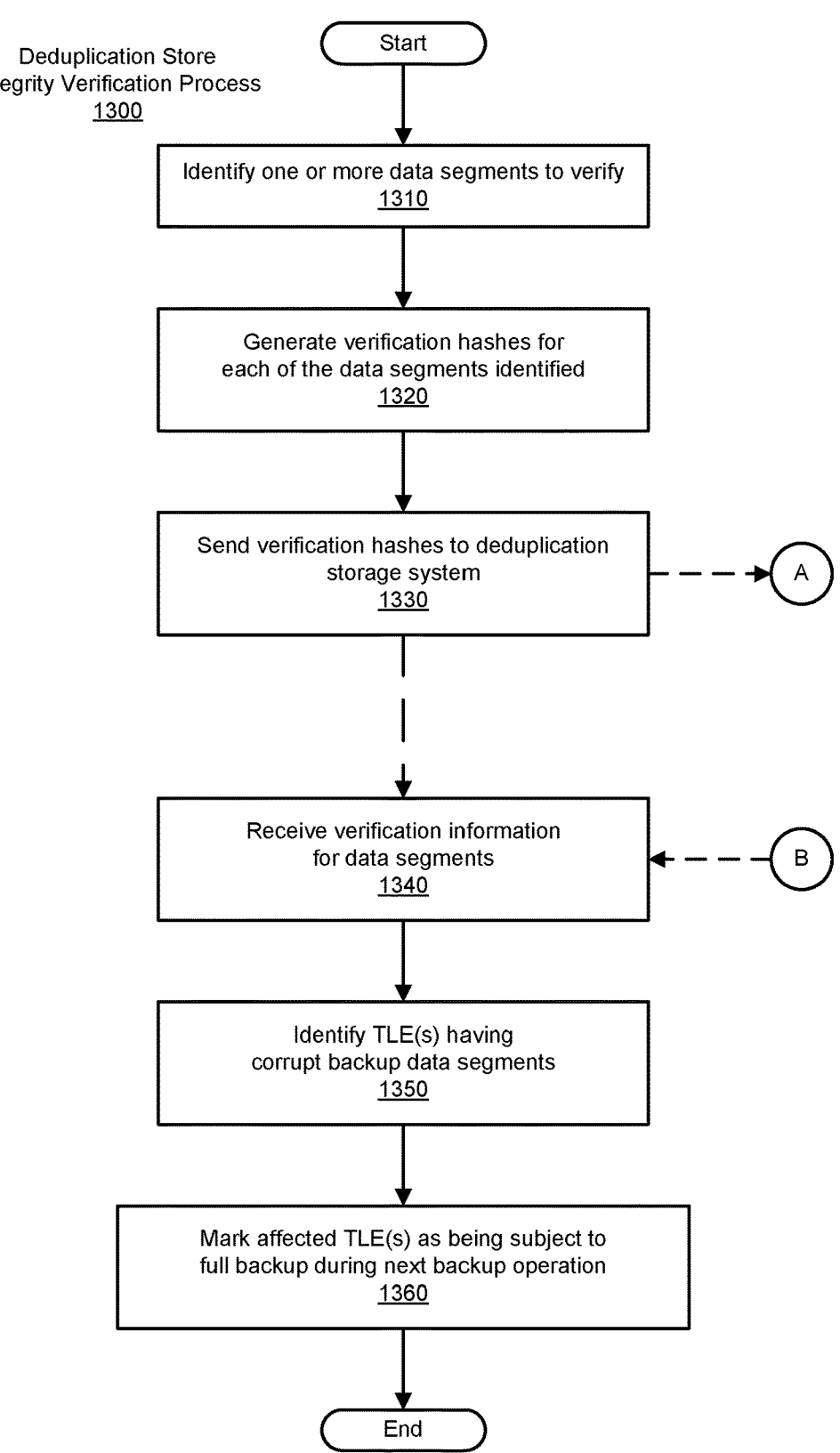

Start

Identify one or more data segments to verify
1310

Generate verification hashes for
each of the data segments identified
1320

Send verification hashes to deduplication
storage system
1330

A

Receive verification information
for data segments
1340

B

Identify TLE(s) having
corrupt backup data segments
1350

Mark affected TLE(s) as being subject to
full backup during next backup operation
1360

End

*Fig. 13*

Verification Information Generation Process
1400

METHODS AND SYSTEMS FOR IMPROVED BACKUP PERFORMANCE

CROSS-REFERENCE TO RELATED APPLICATIONS

This application is a continuation of U.S. patent application Ser. No. 17/459,612, entitled "METHODS AND SYSTEMS FOR IMPROVED BACKUP PERFORMANCE," filed Aug. 27, 2021, which claims the domestic benefit under Title 35 of the United States Code § 119(e) of U.S. Provisional Patent Application Ser. No. 63/236,552, entitled "METHODS AND SYSTEMS FOR IMPROVED BACKUP PERFORMANCE." filed Aug. 24, 2021. The above-referenced applications are hereby incorporated by reference in their entirety and for all purposes as if completely and fully set forth herein.

FIELD OF THE INVENTION

The present disclosure relates to storage systems, and more specifically, to methods and systems for improved performance when performing an operation (such as a backup operation) on objects.

BACKGROUND

An ever-increasing reliance on information and computing systems that produce, process, distribute, and maintain such information in its various forms, continues to put great demands on techniques for providing data storage and access to that data storage. Business organizations can produce and retain large amounts of data. While data growth is not new, the pace of data growth has become more rapid, the location of data more dispersed, and linkages between data sets more complex. Data deduplication offers business organizations an opportunity to dramatically reduce an amount of storage required for data backups and other forms of data storage and to more efficiently communicate backup data to one or more backup storages sites.

Generally, a data deduplication system provides a mechanism for storing a unit of information only once. Thus, in a backup scenario, if a unit of information is stored in multiple locations within an enterprise, it is desirable to store only one copy of that unit of information. Similarly, if the unit of information does not change during a subsequent backup, another copy of that unit of information need not be stored, so long as that unit of information continues to be maintained by the backup storage system. Data deduplication can also be employed outside of the backup context, thereby reducing the amount of information needing to be transferred and the active storage occupied by duplicate units of information. As will be appreciated, reducing unwanted overhead in the transfer of data in such systems is desirable, from the perspective of data communication and storage resource demands, among other such considerations.

SUMMARY

The present disclosure describes methods, computer program products, computer systems, and the like that provide for improved performance when verifying backup images, allowing verification of backup images in an efficient and effective manner. Such methods, computer program products, and computer systems include generating representational information (where the representational information is based, at least in part, on at least a portion of information of a top-level entity), retrieving a stored representational information (where the stored representational information is based, at least in part, on the at least the portion of the information of the top-level entity, the stored representational information is retrieved from log information produced as part of a backup operation, and the backup operation produced a backup image of the top-level entity), determining whether the representational information and the stored representational information match, and, in response to a determination that the representational information and the stored representational information do not match, indicating that the backup image of the top-level entity is corrupt.

In certain embodiments, in which the top-level entity comprises a plurality of objects and the computer system implements a backup host, such computer program products, and computer systems can include requesting one or more objects of the plurality of objects from a workload (where the backup host and the workload are in communication with one another) and receiving the one or more objects at the backup host (where the information of the top-level entity comprises the one or more objects). In other certain embodiments, the backup image of the top-level entity is generated from a backup stream and the backup stream is assigned to the backup host, which backs up the backup stream into the backup image of the top-level entity. In such embodiments, the backup host is one of a plurality of backup hosts, the backup stream comprises information regarding each object of the plurality of objects, and the backup host backs up the information regarding the each object of the plurality of objects into the backup image of the top-level entity. In certain embodiments, the top-level entity is a container, the container of one of a plurality of containers, the log information is a tracklog that is one of a plurality of tracklogs, each of which corresponds to a corresponding backup stream of a plurality of backup streams, and the backup image of the top-level entity is the backup stream of the plurality of backup streams that corresponds to the tracklog.

In certain embodiments, identifying one or more top-level entities (where the one or more top-level entities comprise the top-level entity) and, for each top-level entity of the one or more top-level entities, obtaining metadata of the each top-level entity and performing the generating the representational information for the each top-level entity, using the metadata of the each top-level entity. In such embodiments, for the each top-level entity of the one or more top-level entities, obtaining data of the each top-level entity, obtaining added/modified/deleted information for the each top-level entity, and performing the generating the representational information for the each top-level entity, using the data of the each top-level entity, the metadata of the each top-level entity, and the added/modified/deleted information for the each top-level entity. In such embodiments, where the top-level entity comprises a plurality of objects, the added/modified/deleted information for the each top-level entity comprises added/modified/deleted information for each object of the plurality of objects, such computer program products, and computer systems can include retrieving stored added/modified/deleted information for the each object of top-level entity from a workload, determining whether the added/modified/deleted information for each object of the plurality of objects and the stored added/modified/deleted information for the each object of top-level entity match, and, in response to a determination that the added/modified/deleted information for each object of the plurality of objects and the stored added/modified/deleted information for the each object of top-level entity do not match, performing the indicating that the backup image of the top-level entity is corrupt.

In some embodiments, directive in the track the top-level entity comprises a plurality of objects, the log information is a tracklog that maintains a tuple for each object of the plurality of objects, and the tuple for the each object of the plurality of objects comprises an object identifier and object metadata. In such embodiments, such methods, computer program products, and computer systems can include performing a hash operation on the object identifier of a tuple of an object of the plurality of objects and performing the hash operation on the object metadata of the tuple of the object of the plurality of objects.

In still other embodiments, where the top-level entity comprises a plurality of objects, such methods, computer program products, and computer systems can further include discarding the backup image of the top-level entity (where the backup image of the top-level entity is corrupt as a result of a failure in the backup operation, corruption of a token or delta link representing an incremental backup image of one or more objects of the top-level entity, or corruption of the one or more objects of the top-level entity) and generating another backup image of the top-level entity by performing the backup operation only as to the top-level entity.

In yet other embodiments, in response to an indication that the backup image of the top-level entity is corrupt, such methods, computer program products, and computer systems can include obtaining a prior incremental backup image of the top-level entity (where the backup operation is an incremental backup operation, the backup image of the top-level entity is an incremental backup image of the top-level entity, the prior incremental backup image of the top-level entity was generated by a prior incremental backup operation, and the prior incremental backup operation was performed prior to the incremental backup operation). In such embodiments, where the top-level entity is one of a plurality of top-level entities and the computer system implements a backup host of a plurality of backup hosts, such methods, computer program products, and computer systems can further include assigning each of the plurality of top-level entities to a corresponding one of the plurality of backup hosts and generating a corresponding backup stream at the corresponding one of a plurality of backup hosts by causing the corresponding one of the plurality of backup hosts to perform a corresponding backup operation on the each of the plurality of top-level entities.

In yet other embodiments, such methods, computer program products, and computer systems can include reassigning one or more of the each of the plurality of top-level entities from the corresponding one of the plurality of backup hosts to another corresponding one of the plurality of backup hosts and generating another corresponding backup stream at the another corresponding one of the plurality of backup hosts by causing the another corresponding one of the plurality of backup hosts to perform another corresponding backup operation on the one or more of the each of the plurality of top-level entities. In certain embodiments, the top-level entity comprises a plurality of objects, the plurality of objects are stored in a container, and the top-level entity is one of one or more files of a user account, an electronic mail account, a virtual disk, or a virtual machine.

The foregoing is a summary and thus contains, by necessity, simplifications, generalizations, and omissions of detail; consequently those skilled in the art will appreciate that the summary is illustrative only and is not intended to be in any way limiting. Other aspects, inventive features, and advantages of the present disclosure, as defined solely by the claims, will become apparent in the non-limiting detailed description set forth below.

BRIEF DESCRIPTION OF THE DRAWINGS

Embodiments of methods and systems such as those disclosed herein may be better understood, and its numerous objects, features, and advantages made apparent to those skilled in the art by referencing the accompanying drawings.

FIG. 13 is a flow diagram illustrating an example of a the duplication store integrity verification process, according to embodiments of methods and systems such as those disclosed herein.

Figure 1:
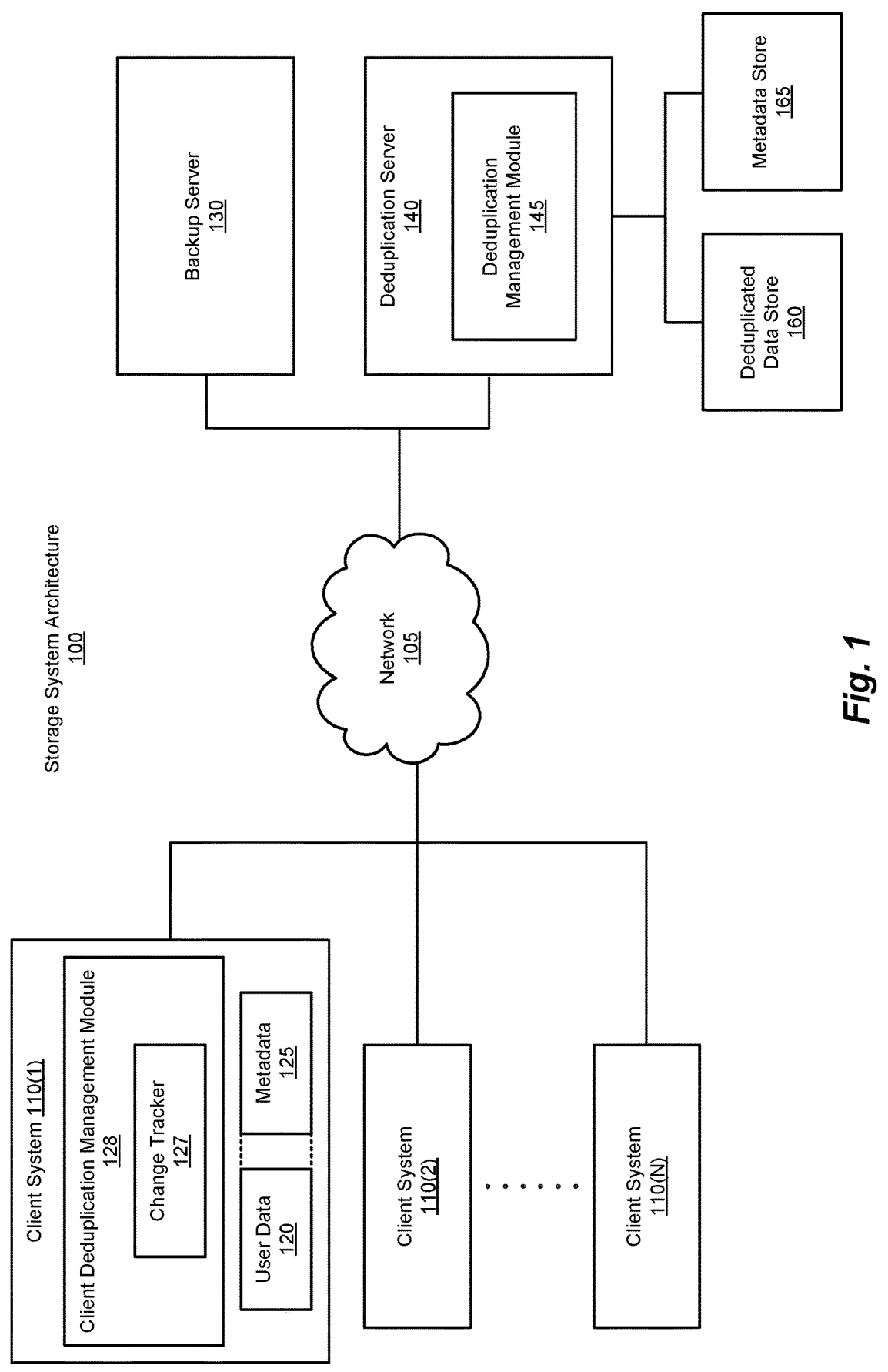
FIG. 1 is a simplified block diagram illustrating an example of a storage system architecture, according to embodiments of methods and systems such as those disclosed herein.

While the present disclosure is susceptible to various modifications and alternative forms, specific embodiments of the present disclosure are provided as examples in the drawings and detailed description. It should be understood that the drawings and detailed description are not intended to limit the present disclosure to the particular form disclosed. Instead, the intention is to cover all modifications, equivalents, and alternatives falling within the spirit and scope of the present disclosure as defined by the appended claims.

DETAILED DESCRIPTION

The following is intended to provide a detailed description and examples of the methods and systems of the disclosure, and should not be taken to be limiting of any inventions described herein. Thus, because the methods and systems described herein are susceptible to various modifications and alternative forms, it will be appreciated that specific embodiments are provided as examples in the drawings and detailed description. It should be understood that the drawings and detailed description are not intended to limit such disclosure to the particular form disclosed. Instead, the intention is to cover all modifications, equivalents and alternatives falling within the spirit and scope of the appended claims.

Introduction

Methods and systems such as those described herein provide for improved backup performance, and so are, broadly, directed to efficient, effective backup operations. More particularly, such methods and systems provide for the efficient, effective backup of objects, and particularly so in situations in which large numbers of objects need to be backed up.

In general terms, backup operations may be full or incremental. A full backup operation produces a full backup or a copy of all data—data that has changed as well as data that is unchanged (e.g., from a workload, as described subsequently). An incremental backup operation produces an incremental backup or a copy of only data that has changed (e.g., since a prior full or incremental backup operation). In the context of methods and systems such as those described herein, and incremental backup operation may send a request to the appropriate work(s) for only the data that has been changed, added, deleted (e.g., objects) since the last backup operation. In so doing, and incremental backup operation provides improved efficiency with regard to network and storage resources by limiting the amount of data needing to be communicated in store.

Some backup systems offer another option. For example, a synthetic full backup operation can be used, which consolidates a baseline full backup, and one or more incremental backups into a new full backup. The new full backup can then be used for further incremental backup operations. Generally, a new full backup of a given data set is preferable to definitively protect the data set in question.

Because a synthetic full backup synthesis process produces a (synthesized) full backup from incremental backups, such an approach minimizes the resource requirements related to the incremental backups. However, because a synthetic full backup produces a new full backup by piecing together a full backup from parts of the last full backup and intervening incremental backups, performing a synthetic full backup operation relies on previous backup images in forming the latest backup image (at the given point in time—a given point-in-time can be thought of the state of the workload at an instance when the backup job is initiated; a point-in-time (PIT) can result in several images).

Disclosed herein are methods, systems, and processes to backup objects by partitioning such objects based, at least in part, on an entity of a given entity type, with which such objects might be associated (e.g., the files of a user of a number of users, the emails of an email account of a number of email accounts, the virtual disk of a virtual machine of a number of virtual machines, and/or the like). In so doing, such methods and systems treat each such entity as a top-level entity (TLE), each of which is treated as an atomic entity for purposes of backup operations, failures, and so on. For each such TLE, changed data is identified and included in a backup stream. The backup stream is then backed up at a storage location (e.g., by a backup server). Such an approach is particularly advantageous when backing up relative large numbers of such objects.

Approaches such as those described herein can also improve the speed of synthetic full back-up operations by facilitating the efficient backup of large numbers of objects and avoiding the failure of one such object to cause an entire backup operation to fail. To this end, such an approach can be designed to combine changed data with a list of data that has already been backed up during a previous full or incremental backup operation (e.g., by using a state file) and deduplicates this combination of data, on the basis of the defined top-level entity described subsequently. Therefore, by independently tracking and deduplicating data that has already been backed up, approaches such as those described herein only require changed data to create a synthetic full backup in roughly the same time it takes to run an incremental backup operation. These and other issues, features, and benefits are now described In certain embodiments, backup operations performed on object stores are tracked by maintaining a tracklog that reflects the state of a TLE's data (e.g., information regarding changes made to the TLE's data since an earlier point in time, such as the point in time that a previous backup operation was performed), which is (then) updated when a (subsequent) backup operation is performed. A tracklog is a log that maintains a tuple for each object, which can be maintained, for example, in the same sequence as the object occurs in the backup image. For example, a tracklog may be of the form:

```
<
object identifier, object metadata, offset, length,
    [<checksum, size>
    <checksum, size>,
    ...]
>
``` where, in certain embodiments, a <checksum, size> tuple exists for every fixed or variable sized block of the object. Offset is the offset of the object within the image.

Objects in subsequent backups are expected to be processed in the same order they were processed in the first backup, as a result of the order in which such objects are presented by their workload (e.g., an application instance for which an operation (e.g., a backup operation) is to be formed). Workloads such as file systems typically honor the same traversal sequence every time the workloads traverse the information they maintain, and in doing so, typically present such information to systems performing a given operation (e.g., a backup operation) in the same order. Therefore, as objects are scanned, an added, modified, or deleted object can be identified by traversing the tracklog in the same order. In the context of a backup operation, if a sequence of objects is unchanged, the underlying deduplication-enabled storage is issued a directive to include the (unchanged) data segments from a previous backup at the given offset and length (size). If objects are modified or added, the new blocks are sent in the given backup stream (referred to herein as being "inlined") for use in synthesizing the resulting backup image. A new tracklog is generated and stored for the new backup image, with offsets and lengths recorded in the given tracklog. A backup stream sent to the storage system thus consists of some number of INCLUDE and INLINE primitives, as well as the inlined data. The storage system then synthesizes a full backup image, based on data included from earlier backup images and changed data inlined in the backup stream. While such an approach works well for most workloads, certain problems can arise with some modern workloads:

1. The workload may be such that it may provide objects in any order, at any given time.
2. The number of objects being backed up can grow large, causing tracklogs to grow large. This is particularly problematic where the mechanism such tracklogs use for identifying the objects is inefficient.
3. The given workload may be capable of providing added/modified/deleted (AMD) information regarding objects, with respect to last backup, by generating and providing a token (referred to herein as a delta link or token, which can, in certain embodiments, be thought of as identifying a snapshot), that may be referred to during the next backup operation. Sometimes the workload may be unable to provide AMD information, or the token may become corrupted. Such circumstances are particularly problematic where tracklogs are inefficient with respect to storage space, as such inefficiency can lead to the inability to store prior tracklogs (or at least, the inability to store prior tracklogs efficiently).
4. With respect to the load-balancing provided by methods and systems such as those described herein, such backup operations should support the ability to reassign backup streams in architectures that support multiple streams spanning multiple backup hosts. A backup host is a stateless computing entity that acts as a client. While a backup host in a cache certain state information for use in subsequent backup operations, a backup host is capable of functioning properly without such state information, and also does not execute a workload (as that term is used herein). A backup host is capable of communicating with a workload and obtaining data therefrom.
5. In such architectures, each stream forms an image. Therefore, tracklogs may need to be redistributed among backup hosts (e.g., with different backup streams being assigned to different backup hosts) based on which objects are being backed up. As will be appreciated from the present disclosure, the backup host tasked with backing up an object will need the tracklog that references the given objects in a prior backup.

6. It is desirable to provide for "forever incremental" strategies, where a first full backup and subsequent backups are incremental. However, there may be concerns with regard to data corruption as a result of repeatedly creating synthetic backups. Thus, ensuring data integrity is desirable.
7. If a failure occurs in a backup operation (or the data of one or more objects is corrupted), failing the entire backup operation is undesirable. This is at least because, in an environment in which large numbers of objects are being backed up, restarting a given backup operation, in view of the large amount of data such large number of objects represent, would result in unacceptably long delays. Similarly, if a backup operation is only partially completed, it is desirable for the next backup operation to leverage the completed portion of that partial backup and proceed from that point onwards, with partially-backed-up objects discarded.
8. In a forever incremental backup scenario (or at least, as between incremental backup up operations) and pointing methods and systems such as those described herein, if an incremental backup from time $T_{m-1}$ cannot be obtained while backing up from point $T_m$ (e.g., due to previous delta links getting corrupted), an incremental backup from time $T_{m-2}$ can be obtained. In so doing, a full backup operation can be avoided.
9. Methods and systems such as those described herein also provide the ability to distribute the objects being backed up across multiple backup hosts. Further, such methods and systems allow reassignment of objects (on a per-TLE basis) to a backup host different from that having backed up the object originally.

As noted, methods and systems such as those described herein partition objects through the use of the concept of a top-level entity (TLE). Such a TLE can be any identifiable entity with which an object could be associated. In certain embodiments, such an object has an object identifier, metadata, and data. Such an object can also have multiple versions. Examples of objects include files, emails, text messages, and/or other such aggregations of digital information.

To address such issues, methods and systems such as those described herein provide for improving the performance of an operation such as a backup operation, particularly when performing such operations on a relatively large number of objects. For example, in certain embodiments, such performance gains can be provided by partitioning such objects based, at least in part, on an entity of a given entity type, with which such objects might be associated, as noted. In partitioning objects in this manner, methods and systems such as those described herein are able to support, for example, backup operations for distributed workloads such as software-as-a-service (SaaS) applications, large filesystems, large object stores, virtualized datacenters, email systems, and other such workloads.

As noted, embodiments such as those described herein are directed to addressing the need to perform operations on large numbers of objects (e.g., backup operations), and in so doing, address the foregoing considerations. Taking one or more backup operation as an example, such embodiments can be subject to constraints such as those now described, with considerations at certain points noted therewith:

1. Objects are partitioned into N containers (N being a variable). It is observed that for most workloads of a certain scale, this partitioning can be made on a per-user basis, a per-virtual machine (VM) basis, or some other suitable basis. The entity chosen is referred to herein as a top-level entity (TLE).

2. Such embodiments use this unit (the TLE) as a unit of parallelism, as a unit of restartability, as a failure boundary, and as a unit of distributing load among different backup hosts. Such delineation is maintained by the following constraints:
   a. Objects within a container are not backed up in parallel.
   b. A container is not split among multiple backup streams.
   c. An identification mechanism (e.g., a delta link such as a snapshot link) is maintained on a per-container basis.
   d. A container is a unit of restartability and failure boundary. A container is treated as having been either fully completed or not completed at all.
   e. The added/modified/deleted (AMD) state is computed at a container level.
   f. Tracklogs are maintained on a per-container (per-TLE) basis (e.g., a tracklog is dedicated to each TLE).
3. A hash (e.g., a 32-bit SHA256 hash) over the object identifiers is used to keep the object identifiers compact in the tracklog.
4. A hash (e.g., a 32-bit SHA256 hash) over object metadata is used to keep the metadata compact in the tracklog.
5. The use of such hashes also allows object identification and metadata information to be kept compact.
6. Determination of changes is done at a per-container level. For example, on a given backup host, a number of containers (S) are being backed up in parallel over S backup streams. This facilitates the following process:
   a. The workload in question provides AMD information for a given container.
   b. This AMD information, being compact and bounded in size, provides the ability to cache AMD information for the S containers on a backup host by S backup streams.
   c. While traversing the tracklog for the given container, data segments of unchanged data are identified and the identification stored in an AMD cache.
   d. In generating the backup stream, each span of unchanged data segments is followed by modified or added data.
   e. Deleted objects are identified as well and excluded from the backup image being generated.
   f. At the end of this process, the resulting set of include directives is sent to the deduplication system, such that the include directives sent are minimized, and so, do not overwhelm the deduplication system with unnecessarily numerous metadata updates.
7. For containers that may not honor such AMD processing (or if the delta link is corrupted), the entire list of object identifiers, data, and metadata for those containers can be obtained. This information can be kept in a cache in a compact form. A traversal of tracklogs is done to identify segments of unchanged data (such changed data being identified by comparing metadata hashes), allowing the backup host to obtain changed or new objects from the workload.
8. To check data integrity of a relatively small number of containers at a time, a backup host according to embodiments such as those described herein can request the requisite data from the given workload. The given backup host also requests AMD for those containers.

9. The hashes of this data are compared with the ones in tracklog. This data is validated with the AMD information sent by workload. If this matches, the hashes in the tracklog can be considered to be correct, and the data in the container in question verified. Embodiments such as those described herein send changed data to the deduplication storage system, and for unchanged data, send hashes of fixed size blocks to validate. By validating these, the deduplication storage system ensures the integrity of the included data. In case of a mismatch between the hash of data stored and the hash sent, only the backup image of the given container need be considered corrupt, and a full backup of only the affected containers need be generated.

Thus, methods and systems such as those described herein address the foregoing issues and others by providing techniques that partition objects on a per-TLE basis, and perform the requisite operations on that per-TLE basis. In providing such functionality, methods and systems such as those described herein are able to provide flexible, efficient, and effective techniques for backing up objects. And while the methods and systems described herein are discussed, at points, in terms of their use in specific architectures that implements deduplication systems, it will be appreciated that such methods and systems can be applied in other architectures and scenarios, as well as to other operations, and in so doing, provide advantages such as those described herein.

Example Storage System Architecture

FIG. 1 is a simplified block diagram illustrating components of an example of a deduplication system (depicted, for example, as a deduplication system 100), in which the present disclosure can be implemented. Deduplication system 100 includes a network 105 that communicatively couples one or more client systems 110(1)-(N), a backup server 130, and deduplication server 140 (includes a deduplication management module 145). Each component is discussed in further detail below.

One or more client systems 110(1)-(N), also referred to herein as client devices 110 and/or client systems 110, can be implemented using, for example, a desktop computer, a laptop computer, a workstation, a server, or the like. An example of such computing devices is described subsequently. One or more client systems 110(1)-(N) can be configured to communicate with backup server 130 and deduplication server 140 via network 105. An example of network 105, which can be used by client systems 110 to access backup server 130 and deduplication server 140, is a local area network (LAN) utilizing Ethernet, IEEE 802.11x, or some other communications protocol. While FIG. 1 illustrates client system 110(1) including user data 120 and metadata 125 (and such being associated with one another, by dotted lines), each client system can store different user data 120 and metadata 125 in storage local to the client system.

Also shown as being implemented in client system 110(1) is a change tracker (illustrated in FIG. 1 as a change tracker 127). Change tracker 127 can be implemented, for example, as part of a client deduplication management module (illustrated in FIG. 1 as a client deduplication management module 128). Moreover, change tracker 127 can be implemented, for example, as a change block tracker, detecting data (e.g., data blocks) written by, for example, an application executed by client system 110(1). Such a change block tracker can track units of storage (e.g., disk sectors, data blocks, or the like) that have been changed, for example, by the aforementioned application. Such a list of changed units of storage is referred to herein as a data object change tracking list, or more specifically, a file change tracking list (and more generically as a change tracking stream). Once identified, such changed units of storage can be transferred from the computing system in question to a backup server (e.g., backup server 130) or a deduplication server (e.g., such as deduplication server 140), for example. In certain embodiments, such changed units of storage can be sent to a proxy server, for further conveyance to the proper destination, then or at a later time. As will be appreciated in light of the present disclosure, such an implementation is presented merely as an example, and such change tracking can be performed by any computing device shown in FIG. 1 (e.g., by deduplication server 140) and/or another computing device not shown in FIG. 1.

User data 120 can include various data that is generated and/or consumed by a user of client system 110(1). User data 120 can include executable files, such as those used to implement applications and operating systems, as well as files that are used or generated by such executable files. User data 120 can include files generated by user applications (e.g., word processing programs, email programs, graphics programs, a database application, or the like) executing on client system 110(1). Some of the user data 120 may also be transferred to backup server 130 and/or deduplication server 140 via a network 105 to be included in deduplicated data store 160, and the associated metadata (e.g., metadata 125). Each of client systems 110 can send different user data and metadata to backup server 130 and/or deduplication server 140.

Metadata 125 can include data about the user data 120. Metadata 125 can be generated by client system 110(1), such as during a backup process. Whenever a user (e.g., an application or human user) requests that client system 110 add all or part of user data 120 to the deduplicated data store 160 (e.g., as part of a regularly scheduled full or partial backup of the client system), client system 110(1) can read user data 120 and metadata 125 (or generate metadata 125 about user data 120), such as one or more identifiers (also referred to herein as signatures), that can identify different portions of user data 120. Client system 110 can provide metadata 125 as a list (e.g., a list of signatures) to deduplication server 140. Metadata 125 can be used by deduplication server 140 to determine whether a portion of user data 120 is not already stored in deduplicated data store 160 (and so should be added to the deduplicated data store 160, as further discussed below).

As noted, backup server 130 is also coupled to network 105. Backup server 130 can include one or more physical servers configured to perform a variety of tasks related to management and implementation of backup services for deduplication system 100, such as performing a full or partial backup of a client system. In deduplication system 100, backup server 130 is further configured to communicate with deduplication server 140 for purposes of storing backups of data from client systems 110(1)-(N) in resources controlled by deduplication server 140. Such communication can be via network 105 or via a direct link between the backup server 130 and deduplication server 140. Information that can be provided by backup server 130 to deduplication server 140 can include a unique identification associated with each data stream provided by one of client systems 110(1)-(N) to the deduplication server 140. The backup server 130 can also provide sequence number identification for to identify sequential data transmitted in each uniquely identified data stream. Deduplication server 140 (and more particularly, deduplication management module 145) can then use such information to associate received data streams from client systems 110(1)-(N) in accord with embodiments of the present invention, as further discussed subsequently.

Backup services can be implemented in deduplication system 100 as a client-server application (not shown), with a server component (e.g., residing in backup server 130) and a client component (e.g., residing on client systems 110) of the client-server application. A server component can be configured to communicate with a client component during a backup process. Certain functions of the backup services can be performed by the client and server components, where the functions may be divided between the two components, or may be performed completely by one component or the other, depending on the implementation of the backup application. For example, backup server 130 can be configured to perform tasks that include communicating with client systems 110 to initiate backup tasks on the clients, maintaining databases related to files and other information backed up from file systems associated with the clients, and managing or tracking resources storing backups of client systems 110.

Deduplication server 140 is also coupled to network 105 and performs a variety of tasks related to management and implementation of deduplication services for the system illustrated in FIG. 1. Deduplication server 140 can include one or more physical servers configured to perform a variety of tasks related to deduplication services, which can be managed by deduplication management module 145. For example, deduplication server 140 can provide deduplication services for eliminating duplicated data content in a backup context. Deduplication services help reduce an amount of storage needed to store backups of enterprise data (e.g., user data 120) by providing a mechanism for storing a piece of information only one time. Such storage can be managed by deduplication management module 145. Thus, in a backup context, if a piece of information is stored in multiple locations within an enterprise (e.g., on multiple client systems 110), that piece of information will only be stored one time in a deduplicated backup storage area, such as deduplicated data store 160. Also, if the piece of information does not change between a first backup and a second backup, then that piece of information will not be stored during the second backup as long as that piece of information continues to be stored in the deduplicated backup storage area. Data deduplication can also be employed outside of the backup context, thereby reducing the amount of active storage occupied by duplicated files.

Deduplication services can be implemented in the deduplication system 100 as a client-server application (not shown), with a server component (e.g., residing on deduplication server 140) and a client component (e.g., residing on client systems 110) of the client-server application. For example, during a backup process for storing a backup of user data 120 in deduplicated data store 160, a client component of the deduplication services can be configured to generate metadata 125 about user data 120, such as one or more identifiers, or signatures, that can identify different portions of user data 120, and to communicate metadata 125 to a server component, which is discussed further below. Certain functions of the deduplication services can be performed by the client and server components, where the functions may be divided between the two components, or may be performed completely by one component or the other, depending on the implementation of the backup application.

Deduplication server 140 is, in turn, coupled to network storage for deduplicated data that includes a deduplicated data store 160 and a metadata store 165. Deduplicated data store 160 is a storage area in which deduplicated data can be stored. Deduplicated data store 160 can be configured as single instance storage. In single instance storage, only a single instance of a piece of data is stored. A common use of single instance storage is for maintaining data backups for servers and other computing clients in a network. For each backup, only a single instance of information duplicated in deduplication system 100 will be stored in deduplicated data store 160. In addition, for subsequent backups occurring over time, data items that have not changed from one backup to another need not be stored in the subsequent backup. In this manner, significant savings in data storage space can be realized by eliminating duplicated data content.

Metadata store 165 is a storage area that contains various metadata regarding the deduplicated data that is stored in deduplicated data store 160, such as information regarding backup images stored in deduplicated data store 160 (also referred to herein as a catalog), including, in certain embodiments, references to the files included in a given backup. It is these references (e.g., file references) to which methods and systems such as those described herein are directed, with regard to improving the efficiency with which such references are managed. That being the case, metadata store 165 is configured with data constructs and structures, such as those described subsequently herein, in order to facilitate performance of processes such as those also described subsequently herein.

As will be appreciated in light of present disclosure, a backup operation can result in one or more backup images. Each image has a concatenation of objects in a certain sequence and is stored on storage on media server. Storage can be normal file system, tape, deduplication capable storage. In such a context, embodiments such as those described herein are described in terms of deduplication-capable storage systems.

The various metadata (including metadata 125) can be stored in, among other locations, a central index. For example, deduplication server 140 can use metadata 125, such as the list of signatures (fingerprints) from client systems 110, to determine if portions of a backup image (e.g., portions of user data 120) are non-duplicative of portions already stored in deduplicated data store 160. Once deduplication server 140 determines that a portion of user data 120 is not duplicative of the data already stored in deduplicated data store 160 and thus should be added to the deduplicated data store 160, deduplication server 140 can store a corresponding identifier, or signature, of the portion of user data 120 in the central index. Deduplication server can request the non-duplicative portions (or unique portions) from client systems 110 by identifying the unique portion with the portion's associated signature.

As the unique portions are received via a data stream from client systems 110, the unique portions can be written into a fixed-size container (e.g., also referred to herein as a container file, and includes these and/or other storage construct) stored at deduplication server 140, such as in a cache or other storage system/device. Once the container is full of unique data segments, in certain embodiments, the entire container can be written to a location in deduplicated data store 160. The container written to the deduplicated data store 160 can also include a local container index, which indicates a local location of each unique portion stored within the container. The local container index can contain a signature associated with each unique segment stored in the container, or alternatively can contain a shortened version of the signature of each unique segment stored in the container. Deduplication server 140 can maintain information identifying a container (e.g., a container identifier (a "container ID") of the container) in a central index as a location for each unique portion in the container. The signature of a unique portion can also be associated with the location of the unique portion in an entry of the central index, where the central index includes an entry for each portion stored in the deduplicated data store 160. Thus, an identification of a portion's location, or a container ID, can be found in the central index by using the signature of the portion as a key in the central index. The location of the portion within the container identified by the container ID can be found in the local container index of the container by using at least a part of the signature as a key in the local container index.

Multiple backup images can be stored in the deduplicated data store 160. For example, a first backup image can be captured from user data 120 and can be stored in deduplicated data store 160. A subsequent backup image captured from user data 120 can contain duplicate portions that are identical to portions of the first backup image already stored in deduplicated data store 160 and can contain unique portions that are not identical to portions of the first backup image (e.g., portions that correspond to changed user data 120). The unique portions of the subsequent backup image can be written to deduplicated data store 160, while the duplicate portions will not be written (since the duplicate portions are identical to instances of portions already stored in deduplicated data store 160). Since only single instances of portions of a backup image are stored in deduplicated data store 160, metadata store 165 can provide a mapping of a backup image to the various non-duplicative portions stored in deduplicated data store 160 that compose the backup image. Thus, a single backup image can be associated with multiple portions stored throughout the deduplicated data store 160, and multiple backup images can be associated with a single portion (e.g., the multiple backup images share the single portion). For example, the subsequent backup image can be associated with unique portions of the subsequent backup image that were written to deduplicated data store 160 and with unique portions of the first backup image that were previously written to the deduplicated data store 160. Metadata store 165 can store associations between a backup image and the portions that compose the backup image as a group of references or pointers, where each reference indicates an entry of the central index that corresponds to a portion included in the backup image.

As additional backup images are added to deduplicated data store 160, backup image data can become fragmented across deduplicated data store 160 as portions of changed user data 120 are stored. Thus, a recent backup image stored in deduplicated data store 160 may include portions of recently changed user data 120 contiguously located in deduplicated data store 160, and may include multiple references to previously changed user data associated with older backup images, which are stored in various non-contiguous locations throughout deduplicated data store 160. If a user were to restore the recent backup image from deduplicated data store 160, deduplication server 140 would have to read numerous portions of data associated with older backup images from across the various locations (e.g., various containers) in deduplicated data store 160. Thus, as a backup image becomes more fragmented, restoration of the backup image can become more inefficient due to the increasing amount of time spent on performing a growing number of access operations needed to read each portion of data of the backup image from various locations in deduplicated data store 160 (e.g., determining a location for each of the multiple portions from metadata store 165).

Deduplicated data store 160 and metadata store 165 can be stored in network storage. Network storage can be implemented as network attached storage (NAS), file servers, storage filers, and/or network shares. Network storage can be implemented as a single storage device or as a collection of storage devices. Network storage can also be implemented as a storage area network (SAN), which couples remote storage devices to a server (e.g., a storage server), such that the remote storage devices appear as locally-attached storage devices to the server's operating system (OS), for example. Network storage can include a data volume.

In light of the present disclosure, it will be appreciated that network storage can be implemented by any type of computer-readable storage medium, including, but not limited to, internal or external hard disk drives (HDD), optical drives (e.g., CD-R, CD-RW, DVD-R, DVD-RW, and the like), SSD and/or FLASH memory drives (e.g., USB memory sticks and the like), tape drives, removable storage in a robot or standalone drive, and the like. Alternatively, it will also be appreciated that, in light of the present disclosure, deduplication system 100 and network 105 can include other components such as routers, firewalls and the like that are not germane to the discussion of the present disclosure and will not be discussed further herein. It will also be appreciated that other configurations are possible. For example, client systems 110 can be directly coupled to deduplicated data store 160 and/or metadata store 170, and so on.

The letter N is used to indicate a variable number of devices or components. For example, a variable number of clients are implemented in the deduplication system. Although the letter N is used in describing a variable number of instances of each of these different devices and components, a repeated use of the letter N does not necessarily indicate that each device and component has a same number of N instances implemented in the deduplication system.

Figure 2:
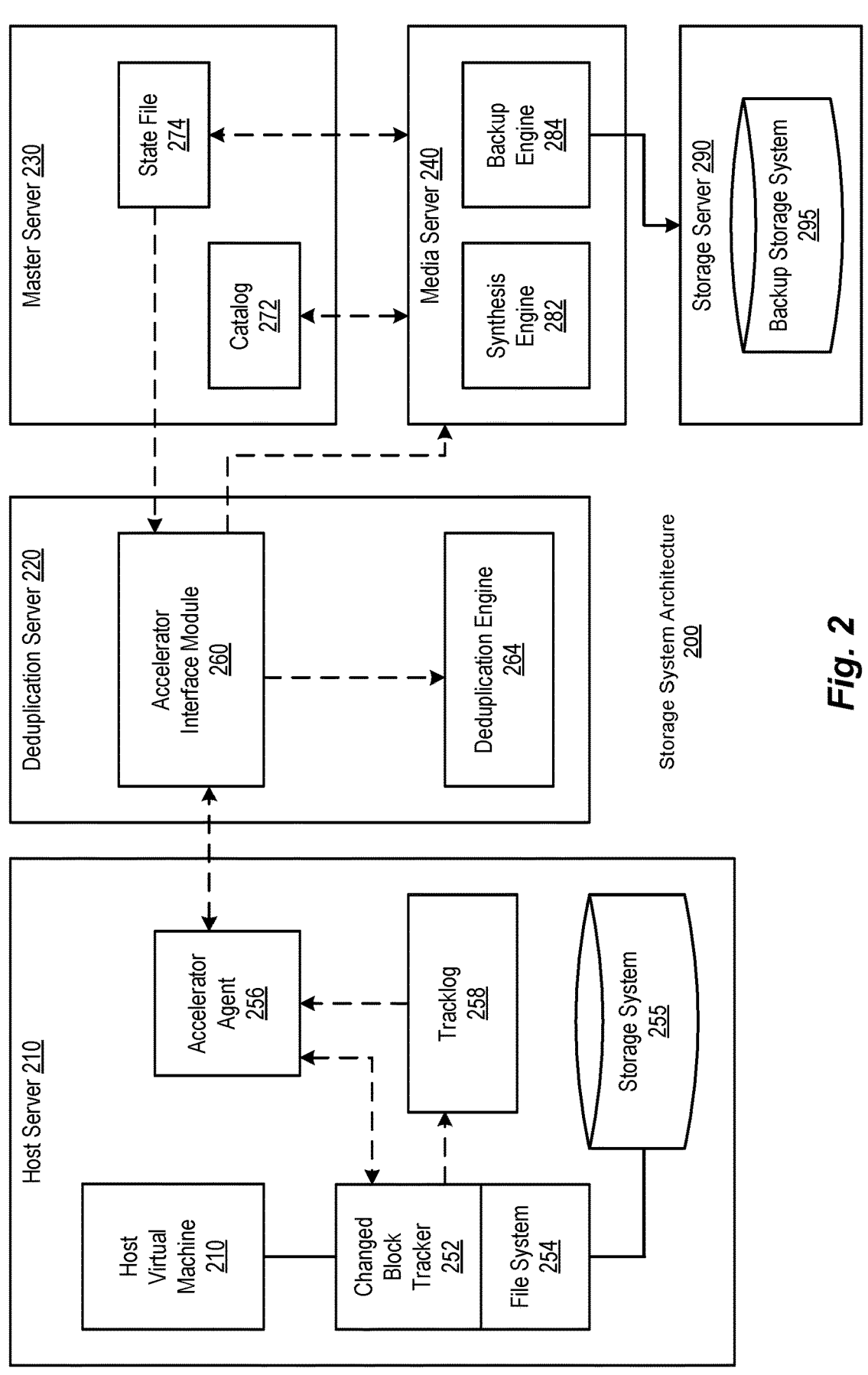
FIG. 2 is a simplified block diagram illustrating an example of a storage system architecture, according to embodiments of methods and systems such as those disclosed herein.

FIG. 2 is a simplified block diagram illustrating an example of a storage system architecture, according to embodiments of methods and systems such as those disclosed herein. To that end, FIG. 2 depicts a storage system architecture 200 that includes a host server 210, a deduplication server 220, a master server 230, and a media server 240. In certain embodiments, the components of storage system architecture 200 can be used to create synthetic full backups (typically in about the same time needed to create an incremental backup operation using other approaches). In the depicted embodiment, host server 210 implements one or more host virtual servers (e.g., depicted as a host virtual machine 250), and includes a changed block tracker 252, a file system 254, and a storage system 255. Metadata and data are transferred between host server 210 (specifically, change block tracker 252 of host server 210) and deduplication server 200 by way of an accelerator agent 256. Accelerator agent 256 can store such metadata and data, as well as information regarding same, a tracklog of host server 210 (e.g., depicted in FIG. 2 as a tracklog 258). In certain embodiments, accelerator agent 256 can be configured to cause change block tracker 252 to store such data, metadata, and associated information in tracklog 258 (or, in the alternative, change block tracker 252 can store such data, metadata, and/or associated information in tracklog 258, as a way of providing that data, metadata, and/or associated information to accelerator agent 256).

In order to support accelerated deduplication, deduplication server 220 includes an accelerator interface module 260 and a deduplication engine 264. Accelerator interface module 260 provides an interface that supports communications with accelerator agent 256.

As noted earlier, modules such as accelerator agent 256 and accelerator interface module 260, having received information regarding a given workload's changed data, are able to provide functionality that allow one or more backup hosts to create tracklogs such as those described herein (e.g., tracklog 258). As will be appreciated, while shown as being two separate modules, the mechanisms of accelerator agent 256 and accelerator interface module 260 can be implemented in any appropriate combination, as between host server 210 (e.g., as part of a given backup host) and deduplication server 220, as well as being spread throughout the servers depicted in FIG. 2 (or other servers, as may be implemented in a given storage system architecture, in fact), as is considered subsequently.

Master server 230 includes a catalog 272 and a state file 274. Media server 240 includes synthesis engine 282 and backup engine 284. Backup engine 284 is communicatively coupled to a storage server 290, which includes a backup storage system 295. Storage server 290 can store one or more backup images of one or more corresponding backups. It will be appreciated that, while state file 274 is depicted as being maintained at master server 230, such need not necessarily be the case, as state file 274 can be maintained at another location in storage system architecture 200.

To create a synthetic full back up, accelerator interface module 260 first requests and obtains changed block (e.g., for each virtual disk included in the backup operation) from host virtual machine 250. Host virtual machine 250, executing on host server 210, can track changed units of data storage (e.g., data segments, data blocks, or other data chunks) using changed block tracker 252, for example. Once identified, changed data blocks from host virtual machine 250 are sent to deduplication server 220.

Next, state file 274, which stores information about each data block (e.g., about each extent of data on a virtual disk), is retrieved from master server 230. In some embodiments, state file 274 can be made available on deduplication server 220. In embodiments of methods and systems such as those described herein, the functions of a virtual machine proxy host (a backup host) can be spread among a number of such backup hosts, as is described in greater detail, subsequently. State file 274 includes information about data blocks that have already been backed up to backup storage system 295 by backup engine 284 (e.g., as part of a previous full or incremental backup).

Based on the information in state file 274, accelerator interface module 260 combines changed data blocks with a list of data blocks that have been already backed up (e.g., information identifying existing data blocks in a full or incremental backup, as obtained from state file 274). The accelerator module of each backup host (e.g., accelerator interface module 260) then transfers this combined data and information to its deduplication engine (e.g., deduplication engine 264). Once this combined data is deduplicated (e.g., to remove data blocks that have been already and/or previously backed up), a synthetic full backup is generated by media server 240 (e.g., by way of synthesis engine 282).

State file 274 is then updated by media server 240 and transferred to master server 230 after the backup of each assigned TLE is completed.

It should be noted that each accelerator interface module (e.g., such as accelerator interface module 260) need only generate catalog data for the changed data blocks of the objects of its assigned TLEs. When media server 240 generates the synthetic full backup (e.g., using synthesis engine 282, as noted), accelerator interface module 260 transfers catalog information needed to create a full backup (e.g., information identifying the location of the data blocks in a backup image) to master server 240. Therefore, a synthetic full backup operation performed using the architecture of FIG. 2 typically consumes as much catalog space as a traditional full backup (though in the alternative, catalog information can also be stored incrementally).

However, since accelerator interface module 260 only processes changed data to create a synthetic full backup, such an architecture can create the synthetic full backup in approximately the same amount of time it takes to create an incremental backup—a significant time-saving advantage. Further, by only sending the data and metadata reflecting changes (e.g., as when employing "forever incremental backups" (typically only a single full backup, followed by only incremental backups after that, as noted)), such an approach avoids inefficient use of computing, network, and storage resources.

Figure 3:
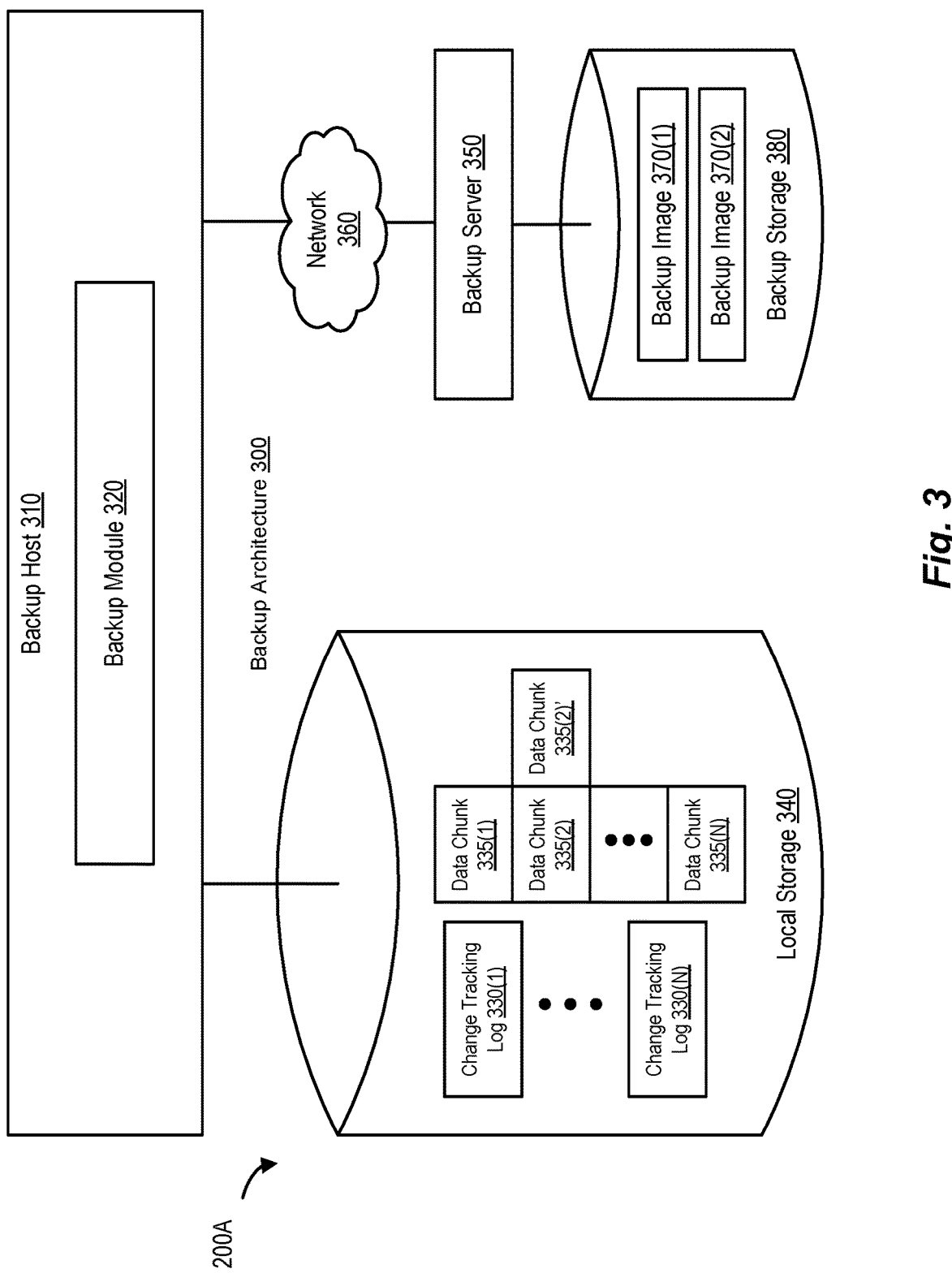
FIG. 3 is a simplified block diagram illustrating components of an example of a backup module, according to embodiments of methods and systems such as those disclosed herein.

FIG. 3 is a simplified block diagram illustrating an example of a backup module, according to methods and systems such as those described herein. That being the case, FIG. 3 depicts one embodiment of a backup host that implements a backup module, according to one embodiment (which is, e.g., depicted as a backup host 310 in FIG. 3). Backup host 310 comprises a backup module 320, which employs one or more change tracking logs (or more simply, tracklogs; e.g., change tracking logs 330(1)-(N)) as shown in FIG. 3 to determine whether a data chunk has changed (e.g., the data chunk contains data that has been changed (modified) in some manner)), in the manner of tracklog 258 of FIG. 2. Such tracklogs can be maintained in local storage (e.g., depicted in FIG. 3 at local storage 340) or can be maintained at a separate location by a client or some other computing system. In this example, and according to one or more embodiments described herein, backup module 320 determines whether to include one or more data chunks (e.g., such as data chunks 335(1)-(N)) in a backup stream, and also determines when and whether to send the backup stream to the associated deduplication and backup servers (e.g., depicted in FIG. 3 as a backup server 350) via a network 360, for example. As shown in FIG. 3, backup server 350 stores the backup stream as one of a number of backup images (e.g., one of backup images 370(1) and 370(2)) in backup storage 380.

Figure 4:
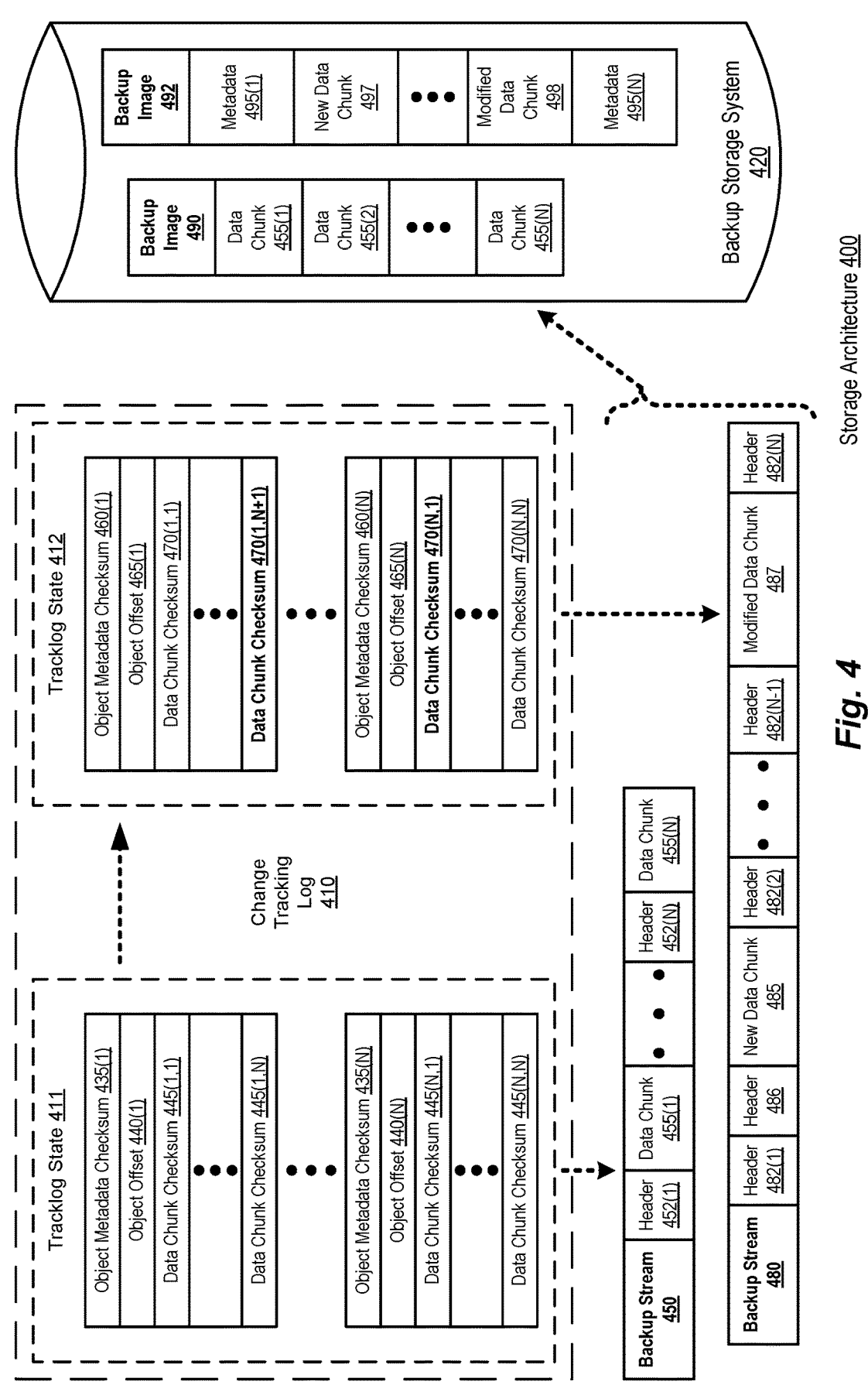
FIG. 4 is a simplified block diagram illustrating components of an example of a storage architecture, according to embodiments of methods and systems such as those disclosed herein.

FIG. 4 is a simplified block diagram illustrating components of an example of a tracklog architecture, according to embodiments of methods and systems such as those disclosed herein. FIG. 4 thus illustrates the manner in which a change tracking log can be used to create one or more backup streams to be sent to a backup server (e.g., by an accelerator such as backup module 320) for storage as one or more backup images, for example.

Tracklog architecture 400 thus includes a change tracking log 410. Change tracking log 410, as depicted in FIG. 4, actually reflects two different states (of many possible states) in which change tracking log 410 might be found: a tracklog state 411 (e.g., that might result from a full backup such as a first full backup in a "forever incremental" backup scheme, in which all data segments are essentially treated as being newly added, and so are included (along with their associated header information) in the resulting backup stream) and another, a tracklog state 412 (e.g., that might result from an incremental backup such as a subsequent incremental backup in a "forever incremental" backup scheme, in which only new or changed data segments (and their associated header information) are included in the resulting backup stream, while unchanged existing data segments have only their associated header information included in the resulting backup stream). Change tracking log 410 is also depicted as including a backup storage system 420 (e.g., such as backup storage 380 of FIG. 3).

In view of the foregoing, it will be appreciated that tracklog state 411 reflects the state of the given TLE as of the aforementioned full backup operation. In the manner noted, such tracklog information will, in certain embodiments, include state information for each of the TLE's objects, each of which, in turn, include information regarding the state of each of the object's data chunks (e.g., one or more data segments of one or more objects of a single TLE (though it is possible for a single tracklog to support multiple TLEs, in certain other embodiments)). That said, other embodiments can include other information (of different information reflecting the state of such objects and data chunks), the objects' metadata, the data chunks themselves, and/or other such data, metadata, and/or other information.

Thus, for each such TLE in such an embodiment, the state of the TLE's data (e.g., objects and their data segments, as might be the case in which a full backup is to be performed on the TLE's data, such as is represented by tracklog state 411) is reflected by such object state information. As depicted in FIG. 4, then, such object state information is illustrated in tracklog state 411 as object metadata checksums 435(1)-(N) (the checksums of the TLE's object's metadata, and referred to in the aggregate as metadata checksums 435) and object offsets 440(1)-(N) (e.g., the offset of the object in the image in question) are recorded for each of the TLE's objects. Tracklog state 411 also reflects information recorded for each of the TLE's objects' data chunks (e.g., data segments), examples of which are depicted in FIG. 4 as data chunk checksums 445(1,1)-(N,N) (and which are referred to in the aggregate as data chunk checksums 445). It is to be appreciated that, as noted earlier, the use of the letter N simply indicates a variable number of elements in the descriptions of the figures presented herein, and its repeated use, as here, is simply intended to represent there being some number of such elements (though such use also does not exclude the possibility of there being the same number of such elements).

As will also be appreciated in light of the present disclosure, the use of a checksum, hash, or other such sufficiently-unique, yet smaller representation of the data, object, or other such construct (e.g., as might be produced by way of a function usable to map data of arbitrary size to sufficiently-unique fixed-size values, for example) provides a more efficient solution. Thus, in one embodiment, such an operation can be performed on data from the TLE's objects to produce a value representative of that data's current state, and then compared with such information stored in the tracklog in question, to allow a determination as to whether the data in question has changed since the tracklog was last written. For example, the use of such constructs reduces tracklog size (as a result of a smaller representation of a data chunk's state (e.g., whether the data chunk is changed/unchanged)), and also improves the efficiency with which such tracklog information is processed (e.g., allowing the identification of changed/unchanged objects by comparing object metadata checksums, and the identification of changed/unchanged data chunks by comparing data chunk checksums). Examples of such processes are presented subsequently.

In view of the foregoing, it will be appreciated that data chunk state information such as data chunk checksums 445 can be used created as part of a backup operation that creates a backup stream such as a backup stream 450 (here, the data of a full backup operation). As described in further detail below, backup stream 450 includes a number of headers (depicted as headers 452(1), which are referred to in the aggregate as headers 452, an which can include the directives noted earlier). Such might be the case, for example, in the situation in which a first full backup is performed (where all existing data is backed up) in a "forever incremental" backup scheme.

The information in change tracking log 410 (e.g., at a point in time subsequent to the aforementioned full backup represented by tracklog state 411) can be used to determine the state of data chunks, allowing for the identification of objects and/or data chunks that have been added, modified, or deleted. For example, tracklog state 412 might result from a subsequent incremental backup, resulting in the given TLE's state information including object metadata checksums 460(1)-(N) (the checksums of the TLE's object's metadata, and referred to in the aggregate as metadata checksums 460) and object offsets 465(1)-(N) (e.g., the offset of the object in the image in question) are recorded for each of the TLE's objects. Tracklog state 412 also reflects information recorded for each of the TLE's objects' data chunks (e.g., data segments), examples of which are depicted in FIG. 4 as data chunk checksums 470(1,1)-(N,N) (and which are referred to in the aggregate as data chunk checksums 470). In the example depicted in FIG. 4, tracklog state 412 also includes state information for a new data chunk (depicted in FIG. 4 as data chunk checksum 470(1, N+1), and bolded for ease of identification). Also included in tracklog state 412 is data chunk checksum 470(N,1), which in this example has been modified (bolded for ease of identification), and which state information is indicative of its corresponding data chunk having been modified. This, as has been noted, will result in the added/modified data being "inlined" (and so, the subject of an INLINE directive).

In the manner noted earlier, the state of the corresponding data chunks, as reflected in tracklog state 412, can thus be used create a backup stream such as a backup stream 480. Here again, it will be appreciated that the data chunks corresponding to data chunk checksums 470 need not, in fact, be maintained as part of change tracking log 410 (and so neither of tracklog states 411 or 412 need actually include such data itself), though it is possible to do so. That said, the use of such representational information provides for more space-efficient tracklogs, allowing for the maintenance of additional tracklogs in a given amount of storage space (and so, allowing for an increase in the number of historical versions of a given TLE's tracklogs to be maintained and/or a larger number of TLEs (and/or larger TLE's) to be supported).

As described in further detail below, backup stream 480 includes a number of headers (depicted as headers 482(1)-(N), and referred to in the aggregate as headers 482), which variously denote existing, modified, and added data chunks. In addition to headers 482, backup stream 480 also includes a new data chunk 485 (e.g., a copy of the new data chunk represented by data chunk checksum 470(1,N+1)) and its associated header (a header 485). Further, backup stream

480 also includes a modified data chunk (depicted in FIG. 4 as a modified data chunk 487, represented by data chunk checksum 470(N,1)) and its associated header (header 482 (N−1)). In the manner noted earlier, the headers for new data chunk 485 and modified data chunk 487 (headers 485 and 482(N−1)) are a result of their respective data chunks, having been added and modified, respectively, being "inlined" (and so, the subject of an INLINE directive).

Backup streams 450 and 480 are used to synthesize synthesized full backup images that are then stored in backup storage system 420 as a backup image 490 (actually a full backup image, it being the result of a first full backup operation) and a backup image 492 (actually a synthetic full backup image, it being the result of a subsequent incremental backup operation). Thus, backup image 490 includes the data chunks discussed earlier with regard to the data produced by a full backup operation being inlined in backup stream 450 (e.g., data chunks 455(1)-(N)), while backup image 492 includes metadata (e.g., such as metadata 495 (1)-(N)) that refers to data chunks in an earlier backup image (e.g., data chunks 455 of backup image 490, referred to as being the subject of an INCLUDE directive, for example). Also included in backup image 490 is any new data chunks (e.g., new data chunk 497 (a copy of new data chunk 485 (itself a copy of the new data chunk represented by data chunk checksum 470(1,N+1)))) and/or any modified (existing) data chunks (e.g., modified data chunk 498 (a copy of modified data chunk 487 (itself a copy of the modified data chunk represented by data chunk checksum 470(N,1)))). Accordingly, if some portion (or all) of a data chunk has been modified, such a change will be detected by comparing the value representing the latest object and/or data chunk (e.g., the aforementioned checksum(s)) with those of the last tracklog entries, in making such a determination. Such a determination can be made and an appropriate synthetic full backup image generated, for example, by a backup module such as backup module 320, which can include the new or modified data chunk in the appropriate backup stream (e.g., backup stream 480) using an INLINE directive, and then send the backup stream to the backup server. The backup server then stores the new/modified data chunk(s), along with the appropriate metadata (for unchanged existing data chunks) in a backup image (e.g., backup image 490 or 492), as noted.

In addition to the data chunk itself, backup module 320 also inserts header information for that data chunk in the backup stream (e.g., in the embodiment depicted in FIG. 4, for backup stream 450, header 452(1) for data chunk 455(1), header 452(2) for data chunk 455(2), and so on). A header is metadata that indicates the existence of a new data chunk (e.g., the data chunk has been added since the last backup operation) or a modified (existing) data chunk (e.g., the data chunk is an existing data chunk that has been modified). As shown in FIG. 4, only the data chunk represented by data chunk checksum 470(N,1) has changed (and so appears in backup stream 480 as modified data chunk 487), although a new data chunk (represented by data chunk checksum 470(1,N+1)) exists, and is included in backup stream 480 as new data chunk 485. In this example, header 482(1) includes an INCLUDE directive that comprehends the data chunks represented by data chunk checksums 470(1,1)-(1,N), while header 486 includes an INLINE directive that indicates that new data chunk 485 is inlined in backup stream 480 following header 486. Header 482(2) could include an INCLUDE directive that, in the present example, might result in metadata in backup image 492 that simply references the data chunks of backup image 490 represented by data chunk checksums 470(2,1)-(N–1,N), which would be an INCLUDE with a size spanning those data chunks. Header 482(N–1) would also include an INLINE directive that indicates that modified data chunk 487 is inlined in backup stream 480 following header 482(N–1) (resulting in the inclusion of modified data chunk 487 in backup image 492, as depicted in FIG. 4). The remainder of the data chunks represented by data chunk checksums 470(N,2)-(N, N) by header 482(N) including an INCLUDE directive for the data chunks of backup image 490 represented by data chunk checksums 470(N,2)-(N,N), which would again be an INCLUDE with a size spanning those data chunks. As shown in FIG. 4, backup stream 492 is stored in backup image 140(2) in backup storage system 420.

In some embodiments, backup images 490 (e.g., a full backup) and 492 (e.g., an incremental backup) are used by an accelerator (backup module 320) to create a synthetic full backup. For example, such an accelerator can determine whether one or more data chunks have already been backed up (e.g., as part of a previous full or incremental backup) in backup images 490 and/or 492. A synthesis engine can then combine new data chunks with a list of data chunks that have been already been backed up. Upon deduplication, a synthetic backup image can be created using backup images 490 and 492. A backup host according to embodiments such as those described herein can thus determine whether or not to include one or more data chunks in a backup stream based on, for example, whether the one or more data chunks have been modified or are new. In this manner, such backup hosts are able to produce a backup stream to be sent to a backup server in an efficient, effective manner.

Figure 5:
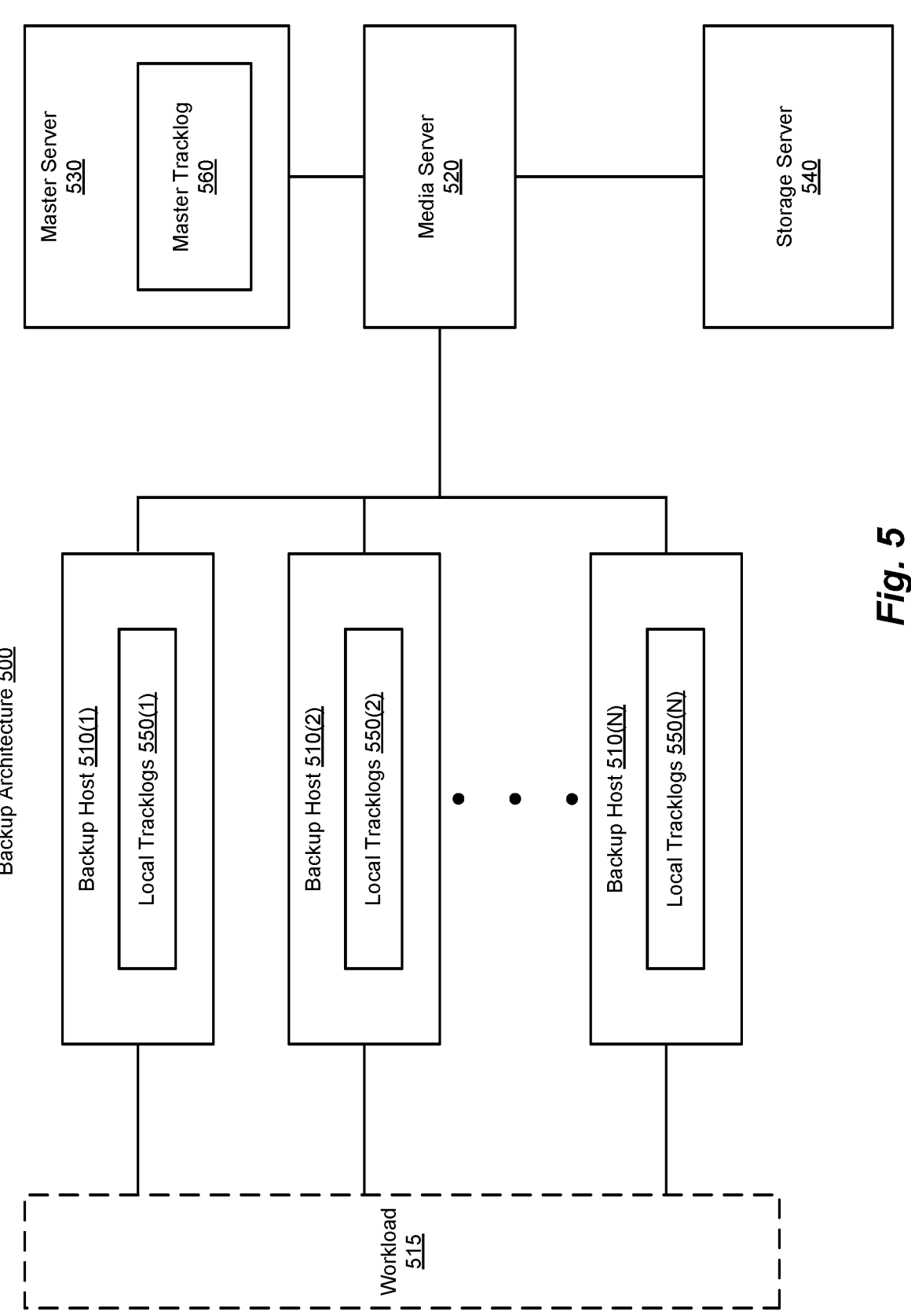
FIG. 5 is a simplified block diagram illustrating components of an example of a backup architecture, according to embodiments of methods and systems such as those disclosed herein.

FIG. 5 is a simplified block diagram illustrating components of an example of a backup architecture, according to embodiments of methods and systems such as those disclosed herein. FIG. 5 thus depicts a backup architecture 500. Certain of the components of backup architecture 500 are comparable to components depicted in earlier block diagrams. Thus, backup architecture 500 includes a number of backup hosts (e.g., depicted in FIG. 5 as backup hosts 510(1)-(N), which are referred to in the aggregate as backup hosts 510, and which are each, in certain respects, comparable to a host virtual machine such as host virtual machine 210 and its associated components), which are in communication with one or more workloads (e.g., an example of which is depicted in FIG. 5 as workload 515). Backup hosts 510 are also in communication with a media server (e.g., depicted in FIG. 5 as a media server 520). As will be appreciated in light of the present disclosure, media server 520 is comparable, in certain respects, media server 240 of FIG. 2. Media server 520, in turn, is communicatively coupled to a master server 530 and a storage server 540. Master server 530 and storage server will 540 are comparable, in at least certain respects, the faster server 230 and storage server 290 of FIG. 2, respectively.

In certain embodiments, each of backup hosts 510 maintains one or more tracklogs locally (e.g., depicted in FIG. 5 as local tracklogs 550(1)-(N), which are referred to in the aggregate as local tracklogs 550). An example of such a local tracklog is discussed in connection with FIG. 6, subsequently. As will be described in greater detail subsequently, each of local tracklogs 550 include a separate tracklog for each top-level entity under backup storage management. As will also be discussed, the maintenance of such local tracklogs is optional, and the utility of such tracklogs can depend on the consistency with which a given top-level entity is assigned to a given backup host. As an example, workload 515 might include one or more email servers, in which case, each user's mailbox might be treated as a top-level entity. That being said, whether or not a given top-level entity remains assigned to a given backup host, master server 530 maintains a master tracklog 560, which maintains tracklog information for all the top-level entities under backup storage management. Such information can be provided to backup hosts that do not already have the requisite information (e.g., as a result of one or more TLEs being reassigned to the requesting backup host).

Figure 6:
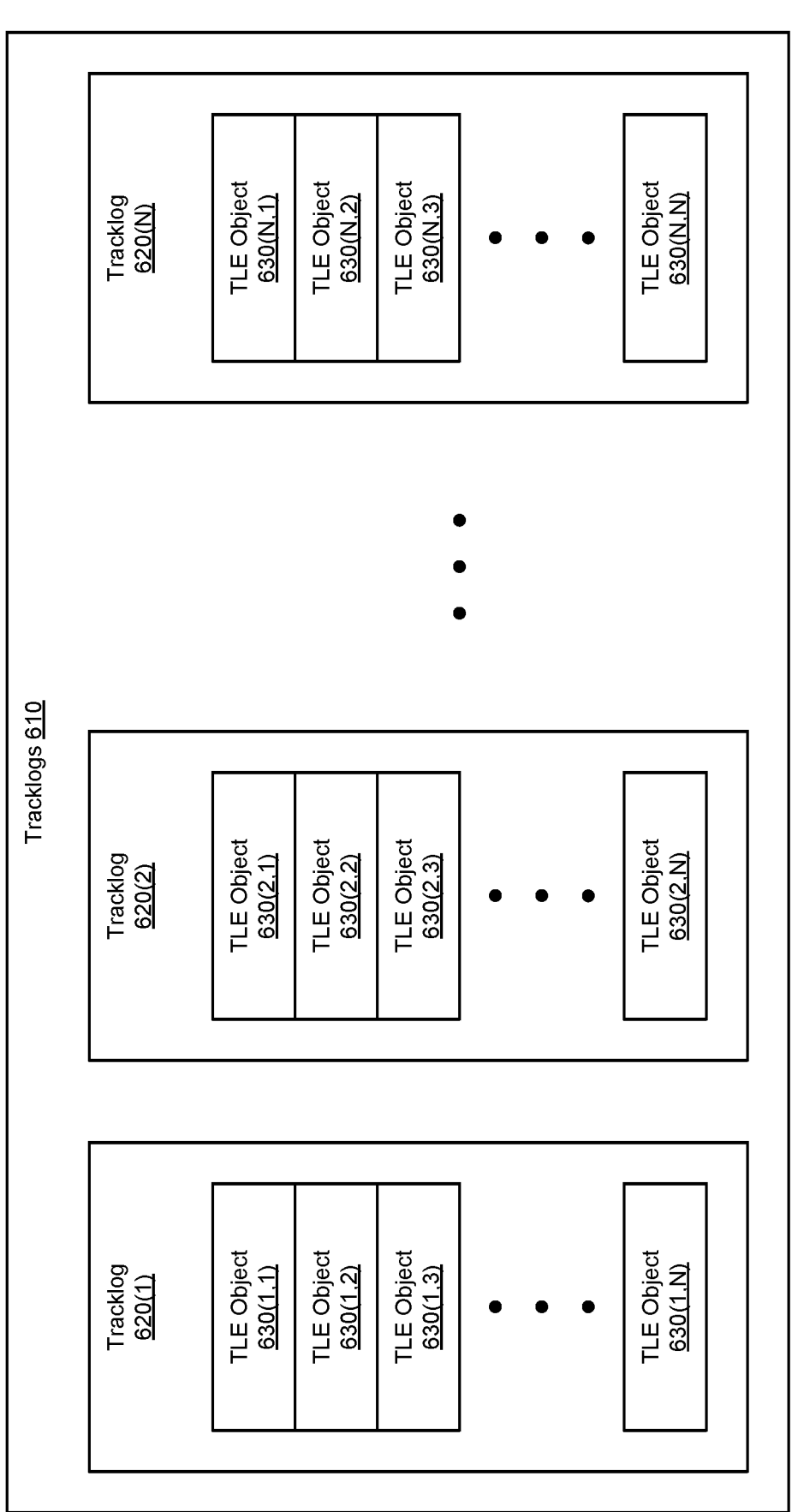
FIG. 6 is a simplified block diagram illustrating components of an example of a tracklog architecture, according to embodiments of methods and systems such as those disclosed herein.

FIG. 6 is a simplified block diagram illustrating components of an example of a tracklog architecture, according to embodiments of methods and systems such as those disclosed herein. FIG. 6 thus depicts a tracklog architecture 600. Tracklog architecture 600 is comparable to one of local tracklogs 550 of FIG. 5, in certain embodiments. That being the case, tracklog architecture 600 includes tracklogs 610, which is comparable, in certain embodiments to a local tracklog such as tracklog 550(1). Tracklogs 610 include a number of tracklogs (depicted in FIG. 5 as tracklogs 620(1)-(N), which are referred to in the aggregate as tracklogs 620), one such tracklog for each top-level entity (TLE), as noted. In turn, each of tracklogs 620 includes information for each object in the given TLE (depicted in FIG. 5 as TLE objects (TLEOs) 630(1,1)-(N,N), which are referred to in the aggregate as TLEOs 630), representing the state of each of the TLE objects when the last backup operation was performed.

As noted, backup operations performed on a TLE's objects are tracked by maintaining a tracklog that reflects the state of the TLE's objects' data, which is updated when a (subsequent) backup operation is performed. Thus, for a given backup operation, each of TLEOs 630(1,1)-(N,N) of a backup image reflect the state of that object as of the last backup operation. By comparing this information with information regarding the present state of the object, whether or not the given object has changed can be deduced.

Example Storage System Processes

Figure 7:
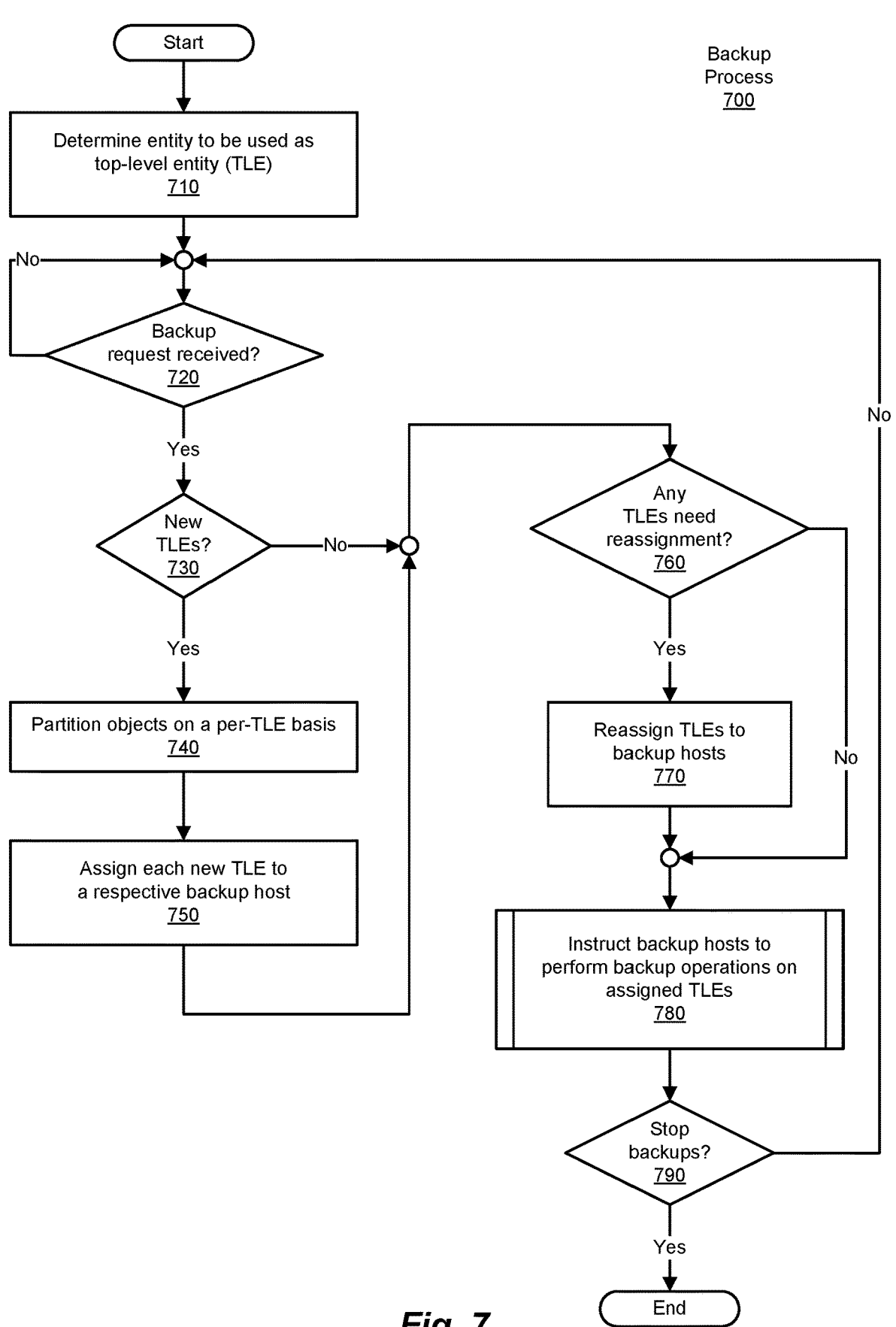
FIG. 7 is a flow diagram illustrating an example of a backup process, according to embodiments of methods and systems such as those disclosed herein.

FIG. 7 is a flow diagram illustrating an example of a backup process, according to embodiments of methods and systems such as those disclosed herein. FIG. 7 thus depicts a backup process 700. Backup process 700 begins with a determination as to the type of entity to be used as the TLE for the backup process (710). As noted elsewhere herein, a TLE can be defined based on one or more of any number of entity types, including, but not limited to, user accounts, email accounts, various portions of filesystem directories, storage volumes, virtual machines, and other types of entities by which objects may be delineated.

Once the type of entity to be used as TLE has been determined, backup process 700 then awaits the receipt of a backup request (720). Backup process 700 iterates at this point, awaiting the receipt thereof. Once a backup request is received, backup process 700 proceeds to a determination as to whether the TLEs in question include one or more new TLEs (730). If a determination is made that one or more new TLEs are to be backed up, objects subject to the backup operation are partitioned on a per-TLE basis (740). Each of these new TLE's is then assigned to a respective one of the backup hosts (750). Such assignment can take into consideration factors such as load balancing between backup hosts, resource requirements availability, and the like.

Once any new TLE's have been assigned to their respective backup host(s), a determination is made as to whether any presently-assigned (existing) TLEs (or new TLEs, in fact) should be reassigned (760). Such may be the case, for example, if the assignment of new TLEs has resulted in load imbalances, computing resources are added to (or removed from) one or more of the backup hosts, and/or other such changes in the computing environment. Also considered, with regard to existing TLEs, is the cost of reassigning a TLE (the processing of information regarding the TLE's objects), with regard to the TLE's tracklog already being maintained at its current backup host (thereby avoiding the need to communicate with the master server and the resources needed to perform the transfer of the tracklog from the master server to the TLE's new backup host). If such reassignment should be performed, a master server (e.g., master server 530) reassigns TLEs as appropriate to accomplish such load balancing (770).

Once such reassignment of TLEs has been performed (if appropriate), backup process 700 proceeds with instructing the backup hosts to perform backup operations on their assigned TLEs (780). Once the requisite backup operations have been performed, backup process 700 makes a determination as to whether further backup requests should be awaited. If such is the case, backup process 700 loops to await the next backup request (720). In the alternative, backup process 700 concludes.

Figure 8A:
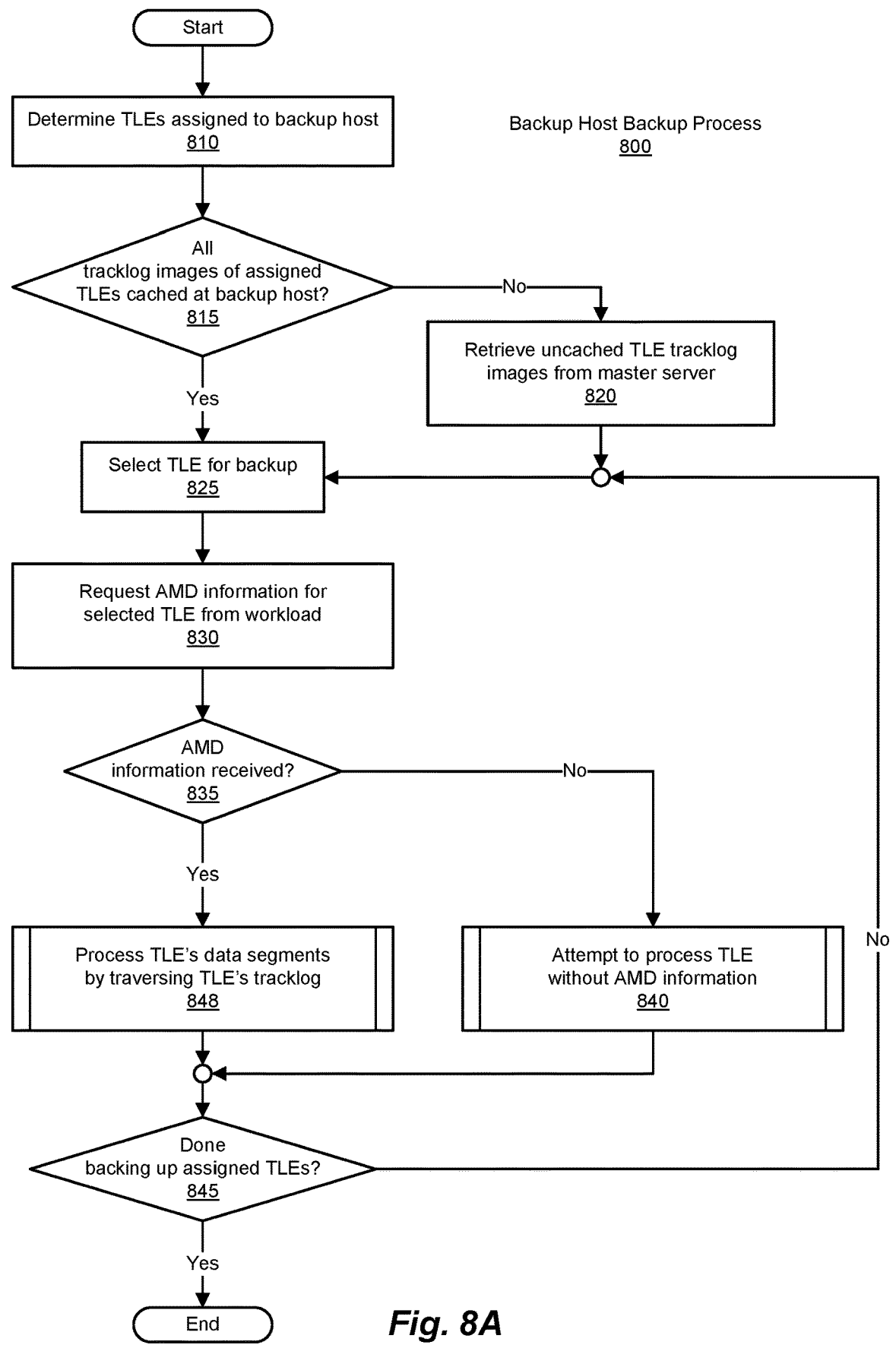
FIG. 8A is a flow diagram illustrating an example of a backup host backup process, according to embodiments of methods and systems such as those disclosed herein.

FIG. 8A is a flow diagram illustrating an example of a backup host backup process, according to embodiments of methods and systems such as those disclosed herein. FIG. 8A thus depicts a backup host backup process 800. Backup host backup process 800 is an example of a process that can be performed by a backup host according to methods and systems such as those described herein. Backup host backup process 800 begins with a determination as to which TLEs are assigned to the backup host in question (810). A determination is then made as to whether any of the assigned TLEs' tracklog images are not currently available at the backup host (e.g., the tracklog images in question are not cached at the given backup host) (815). If one or more TLE tracklog images are not cached at the given backup host, the backup host retrieves such uncached TLE tracklog images from the master server (820). Such might be the case, using backup architecture 500 as an example, where one of backup hosts 510 requests (and receives) the requisite tracklog image information from master server 530.

Once the backup host retrieves uncached TLE tracklog images (or if tracklog images for the assigned TLEs are available at the backup host), backup host backup process 800 proceeds with selecting a TLE for backup (825). The backup host requests added/modified/deleted (AMD) information for the selected TLE from the workload (830). Such might be the case, again using backup architecture 500 as an example, where one of backup hosts 510 requests (and receives) the requisite AMD information from workload 515.

At this juncture, a determination is made as to whether the AMD information for the selected TLE has been received (835). If no AMD information is received for the selected TLE, the lack of AMD is handled by attempting to process the TLE's data segments without such information (840). An example of such handling is discussed in connection with FIG. 8B, subsequently. As is noted elsewhere herein, methods and systems such as those described herein provide for such missed backups of TLEs, and are able to manage such situations by attempting to perform a backup operation such a TLE's information in a subsequent backup operation. Regardless of the outcome of such handling, then, backup host backup process 800 proceeds with making a determination as to whether further assigned TLEs remain to be backed up (845). If more TLEs remain to be backed up, backup host backup process 800 proceeds with selecting one of the remaining assigned TLEs, for backup (840). In the alternative, if no further TLEs remain to be backed up, backup host backup process 800 concludes.

If AMD information is received by the backup host from the workload (860), backup host backup process 800 proceeds with processing the selected TLE's data segments by traversing the TLE's tracklog image (848). An example of a process for traversing data segments of a TLE is described in greater detail in connection with FIG. 9, subsequently. Once the selected TLE's data segments have been processed, backup host backup process 800 returns to a determination as to whether additional assigned TLEs remain to be backed up (845). If more TLEs remain to be backed up, backup host backup process 800 proceeds with selecting one of the remaining assigned TLEs, for backup (825). In the alternative, if no further TLEs remain to be backed up, backup host backup process 800 concludes.

Figure 8B:
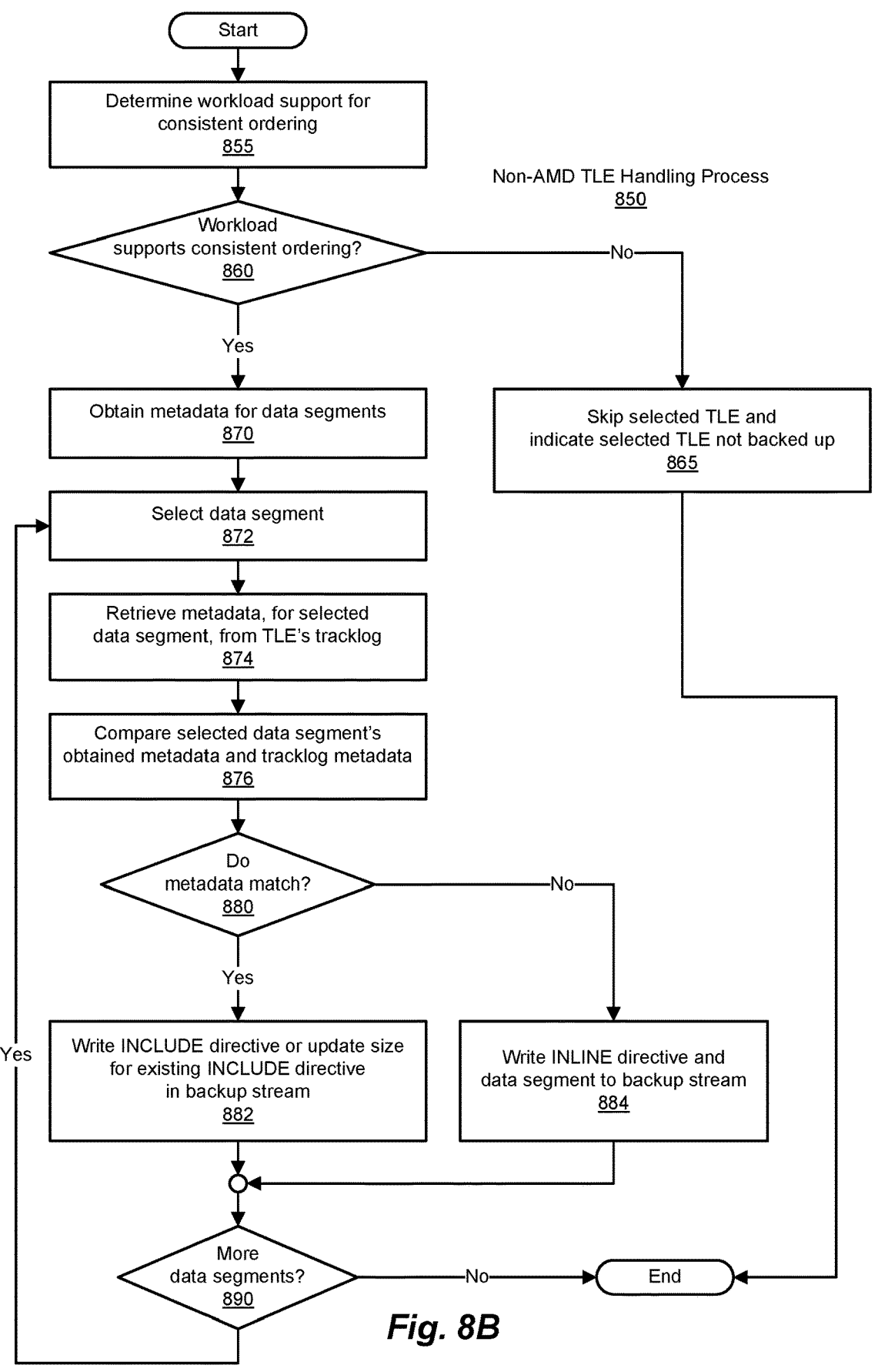
FIG. 8B is a flow diagram illustrating an example of the handling of top-level entity (TLE) data segments, according to embodiments of methods and systems such as those disclosed herein.

FIG. 8B is a flow diagram illustrating an example of the handling of TLE data segments in the absence of AMD information from the given workload, according to embodiments of methods and systems such as those disclosed herein. FIG. 8B thus depicts a non-AMD TLE handling process 850. Non-AMD TLE handling process 850 begins a determination as to whether the question supports consistent ordering of objects (855). An example of workload that provides objects in a consistent order is a file system, which will typically provide information regarding the files stored therein in a consistent order (e.g., in alphabetical order). If the workload does not support consistent ordering (860), the selected TLE (and so it's data segments) are skipped, an indication made to the backup host that the selected TLE has not been backed up (865). Non-AMD TLE handling process 850 then concludes. As will be appreciated in light of the present disclosure, such a scenario is merely one example of a situation in which a TLE's image is not backed up (given that a TLE is treated as an atomic unit). As noted elsewhere herein, methods and systems such as those described herein provide for such missed backups of TLEs, and are able to manage such situations by attempting to perform a full backup of such a TLE's information, in a subsequent backup operation.

In the alternative, if the given workload supports consistent ordering (860), metadata for the data segments of the TLE are obtained (870). Next, one of these data segments is selected (872). Tracklog metadata for the selected data segment is retrieved from the TLE's tracklog (874). The selected data segment's obtained metadata (i.e., the metadata obtained from the workload for the given data segment) and retrieved tracklog metadata are then compared to determine whether the data segment has changed (e.g., since the TLE's tracklog was last written) (876). The result of this comparison is then examined as to whether the obtained workload metadata and the retrieved tracklog metadata match (880). If the obtained workload metadata and retrieved tracklog metadata match, an INCLUDE directive is written into the backup stream, unless there is an existing INCLUDE directive the backup stream, in which case, the size information in that existing INCLUDE directive is updated to account for the instant data set (882). In the alternative, if the obtained workload metadata and tracking metadata do not match (880), non-AMD TLE handling process 850 proceeds with writing an INLINE directive into the backup stream, along with the selected data segment (884).

In either case, a determination is then made as to whether additional data segments for the given TLE remain to be processed (890). If additional data segments remain to be processed, non-AMD TLE handling process 850 proceeds with selecting the next such data segment (872), and processing that selected data segment (872). In the alternative, if no further data segments remain to be processed, non-AMD TLE handling process 850 concludes.

Figure 9:
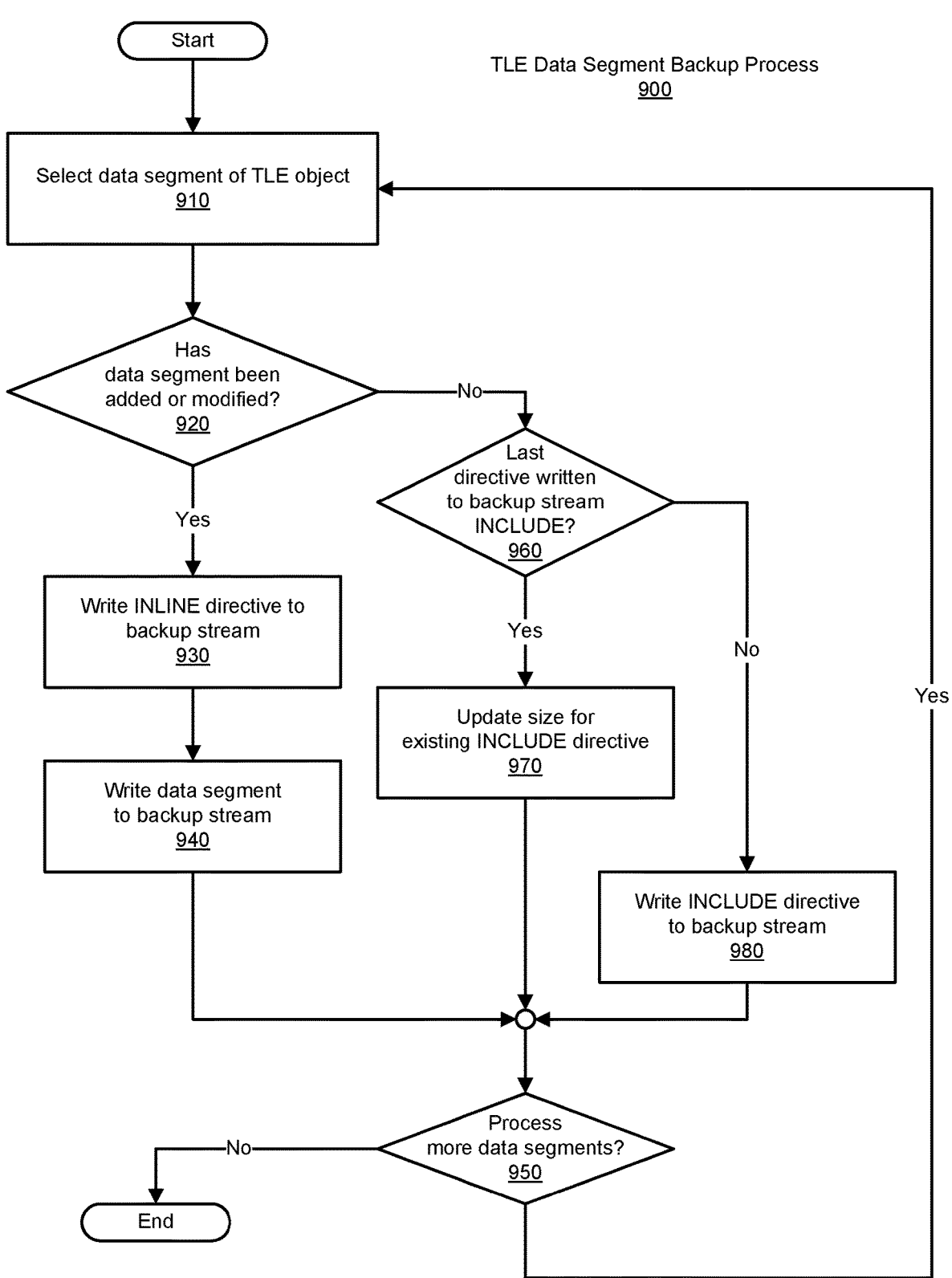
FIG. 9 is a flow diagram illustrating an example of a TLE data segment backup process, according to embodiments of methods and systems such as those disclosed herein.

FIG. 9 is a flow diagram illustrating an example of a TLE data segment backup process, according to embodiments of methods and systems such as those disclosed herein. FIG. 9 thus depicts a TLE data segment backup process 900. TLE data segment backup process 900 begins with the selection of a data segment of the TLE (one of the TLE's objects) (910). A determination is then made as to whether the selected data segment has been added or modified (920). If the selected data segment is a new data segment (i.e., has been added) or the selected data segment is an existing data segment that has changed since that data segment was last backed up (i.e., has been modified), TLE data segment backup process 900 proceeds with writing an INLINE directive into the backup stream (930) and writing the added/modified data segment into the backup stream (940). At this juncture, TLE data segment backup process 900 proceeds to a determination as to whether more data segments remain to be processed (950). If more data segments remain to be backed up, TLE data segment backup process 900 proceeds with selecting one of the remaining data segments for processing (910). In the alternative, if no further data segments remain to be processed, TLE data segment backup process 900 concludes.

If the data segment in question has not been added or modified (920), TLE data segment backup process 900 proceeds with a determination as to whether the last directive written to the backup stream was an INCLUDE directive (960). If the last directive written to the backup stream was an INCLUDE directive, TLE data segment backup process 900 updates the size information for the existing INCLUDE directive (970). Such a result reflects that the selected data segment in what is a continuing straying of (at least two) unchanged data segments, such that backup information from an earlier backup image can be included in synthesizing the current backup image. As before, if more data segments remain to be backed up, TLE data segment backup process 900 proceeds with selecting one of the remaining data segments for processing (910). Otherwise, TLE data segment backup process 900 concludes.

In the alternative, if the last directive written to the backup stream was not an INCLUDE directive (960), an INCLUDE directive is written to the backup stream, along with other requisite information (e.g., the size and offset of the data segment in question) (980). As before, if more data segments remain to be backed up, TLE data segment backup process 900 proceeds with selecting one of the remaining data segments for processing (910). Otherwise, TLE data segment backup process 900 concludes.

Example Backup Images

Figure 10:
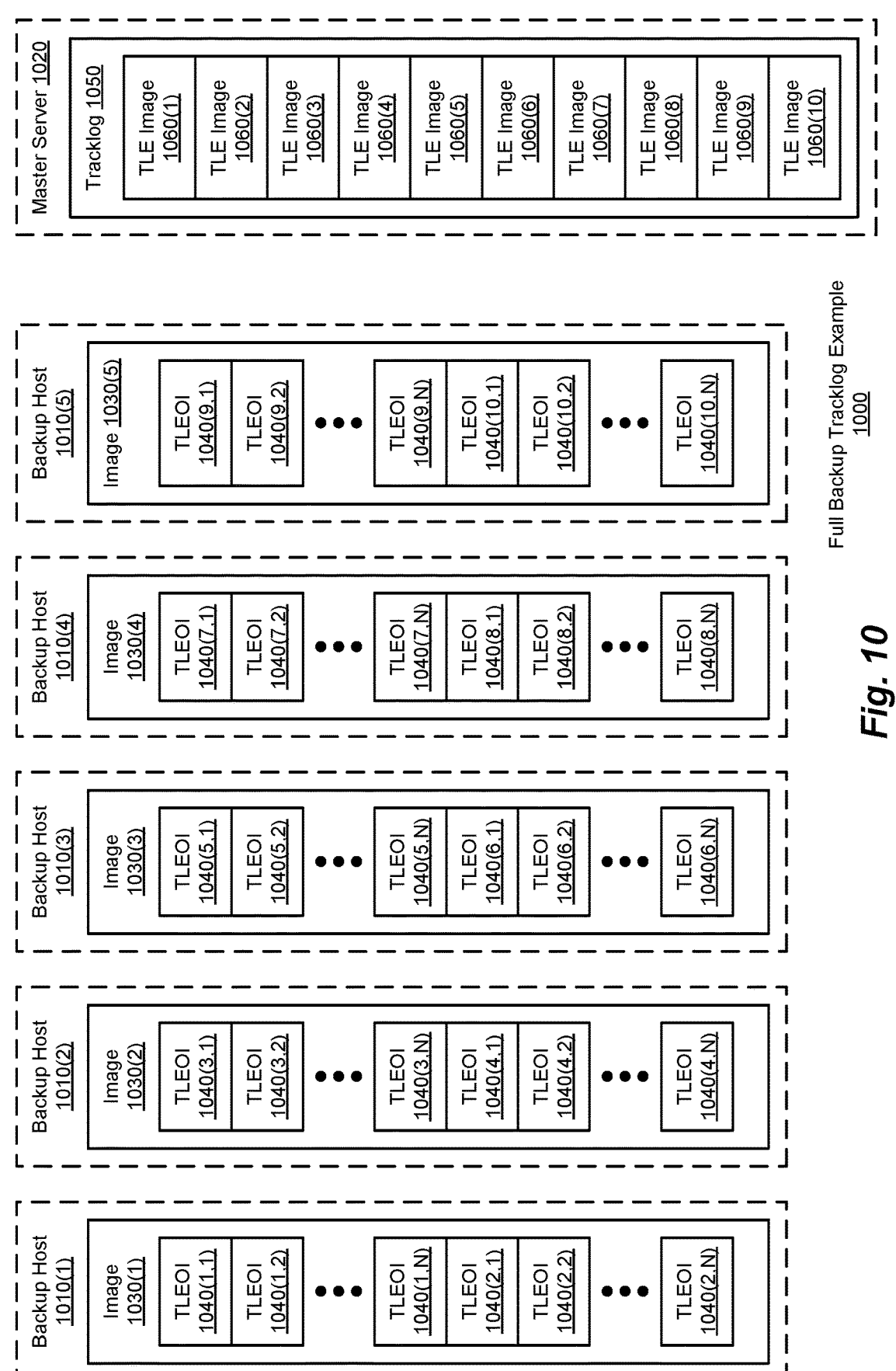
FIG. 10 is a simplified block diagram illustrating components of an example of a full backup tracklog example, according to embodiments of methods and systems such as those disclosed herein.

FIG. 10 is a simplified block diagram illustrating components of an example of a full backup tracklog example, according to embodiments of methods and systems such as those disclosed herein. FIG. 10 thus depicts a full backup tracklog example 1000. As shown in FIG. 10, full backup tracklog example 1000 depicts a system in which five backup hosts (e.g., depicted in FIG. 10 as backup hosts 1010(1)-(5), and referred to in the aggregate as backup hosts 1010) are in communication with a master server (e.g., depicted in FIG. 10 as master server 1020). In full backup tracklog example 1000, ten TLEs ($TLE_1$-$TLE_{10}$) are backed up by backup hosts 1010, in this example resulting in two TLEs being backed up per backup host. Thus, each of backup hosts 1010 produce a backup image (e.g., depicted in FIG. 10 as backup images 1030(1)-(5), which are referred to in the aggregate as backup images 1030) that corresponds to two of the TLEs in question. That being the case, in full backup tracklog example 1000, backup host 1010(1) is responsible for backing up $TLE_1$ and $TLE_2$; backup host 1010(2) is responsible for backing up $TLE_3$ and $TLE_4$; backup host 1010(3) is responsible for backing up $TLE_5$ and $TLE_6$; backup host 1010(4) is responsible for backing up $TLE_7$ and $TLE_8$; and backup host 1010(5) is responsible for backing up $TLE_9$ and $TLE_{10}$. More specifically, with reference to FIG. 10, the TLE object images that make up backup images 1030 are depicted in FIG. 10 as TLE object images (TLEOI) 1040 (1,1)-(N,N) (which are referred to in the aggregate as TLEOI 1040). As discussed earlier, then, each of backup hosts 1010 maintains a backup image of their assigned TLEs. As also described earlier, master server 1020 maintains a master tracklog 1050, which, in turn, includes a TLE backup image for each of the TLEs in question (here, $TLE_1$-$TLE_{10}$; which are depicted in FIG. 10 as TLE images 1060(1)-(10), which are referred to in the aggregate as TLE images 1060). As will be appreciated, once a backup operation has completed, the backup image maintained at a given backup host for a given TLE (one of backup images 1030) and the TLE image maintained at master server 1020 for the given TLE (a corresponding one of TLE images 1060), should be the same. Moreover, it will be appreciated that TLE object images that make up each of TLE images 1060, corresponding to individual ones of TLEOI 1040, are not shown in FIG. 10, for the sake of simplicity.

However, while FIG. 10 depicts $TLE_1$-$TLE_{10}$ as being assigned to backup hosts 1010(1)-(5) in canonical order, such need not be the case, as has been noted previously herein. That being the case, while such an initial assignment of TLEs is certainly possible, the assignment (and/or reassignment) of TLEs to backup hosts in another order is also possible and is well within the capabilities of methods and systems such as those described herein. As also noted earlier, such reassignment may occur for a variety of reasons, including, but not limited to, the addition of new TLEs, the deletion of existing TLEs, the modification of existing TLEs, changes in the computing resources of the backup hosts involved and other work load balancing considerations, and the like. An example of such reassignment is now presented.

Figure 11:
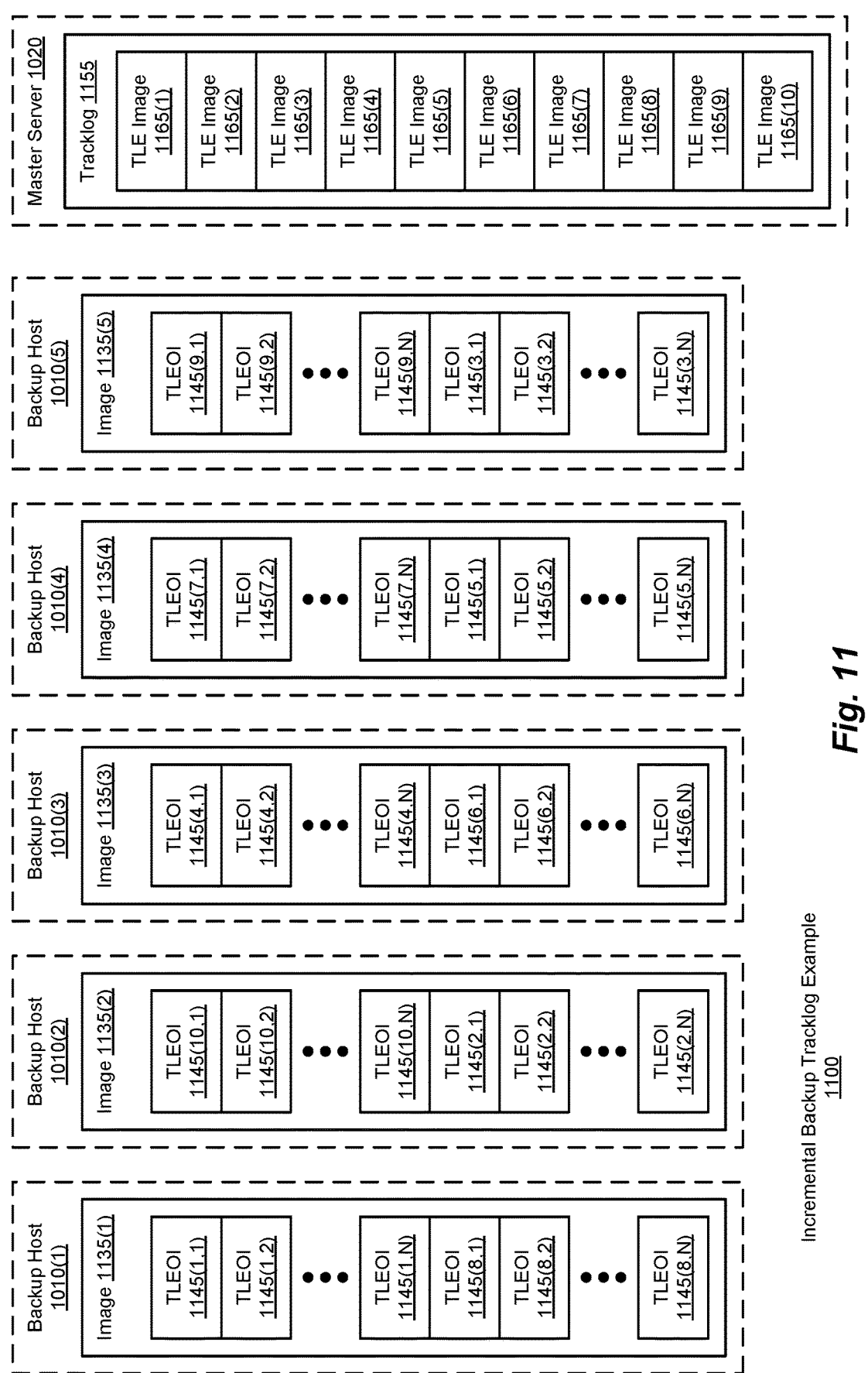
FIG. 11 is a simplified block diagram illustrating components of an example of an incremental backup tracklog example, according to embodiments of methods and systems such as those disclosed herein.

FIG. 11 is a simplified block diagram illustrating components of an example of an incremental backup tracklog example, according to embodiments of methods and systems such as those disclosed herein. FIG. 11 thus depicts an incremental backup tracklog example 1100. As noted above, the reassignment of TLEs to different backup hosts is captured in this example. Incremental backup tracklog example 1100 demonstrates a scenario in which certain of the TLEs being backed up are assigned to the same backup host illustrated in FIG. 10, while other TLEs are assigned to backup hosts different from (and/or in a different order than) those originally assigned. In incremental backup tracklog example 1100, then, the next backup operation after that resulting in full backup tracklog example 1000, is depicted as incremental backup tracklog example 1100, as noted. That being the case, backup hosts 1010 and master server 1020 now reflect such new assignments.

In incremental backup tracklog example 1100, a full backup such as that depicted as full backup tracklog example 1000, results in the reassignment of TLEs to new ones of backup hosts 1010. In this case, backup host 1010(1) is responsible for backing up $TLE_1$, but is now also responsible for backing up TLEs (and is no longer responsible for backing up $TLE_2$); backup host 1010(2) is responsible for backing up $TLE_{10}$ and $TLE_2$ (and is no longer responsible for backing up $TLE_3$ and $TLE_4$); backup host 1010(3) is now responsible for backing up $TLE_4$ and $TLE_6$ (but is no longer responsible for backing up $TLE_5$); backup host 1010(4) is responsible for backing up $TLE_7$ and $TLE_5$ (but is no longer responsible for backing up $TLE_8$); and backup host 1010(5) is now responsible for backing up $TLE_9$ and $TLE_3$ (but is no longer responsible for backing up $TLE_{10}$). That being the case, backup host 1010(1) is now responsible for generating backup image 1135(1) by backing up $TLE_1$ and TLEs into TLEOI 1145(1,1)-(1,N) and TLEOI 1145(8,1)-(8,N); backup host 1010(2) is now responsible for generating backup image 1135(2) by backing up $TLE_{10}$ and $TLE_2$ into TLEOI 1155(10,1)-(10,N) and TLEOI 1155(2,1)-(2,N); backup host 1010(3) is now responsible for generating backup image 1135(3) by backing up $TLE_4$ and $TLE_6$ into TLEOI 1145(4,1)-(4,N) and TLEOI 1145(6,1)-(6,N); backup host 1010(4) is now responsible for generating backup image 1135(4) by backing up $TLE_7$ and $TLE_5$ into TLEOI 1145(7,1)-(7,N) and TLEOI 1145(5,1)-(5,N); and backup host 1010(5) is now responsible for generating backup image 1135(5) by backing up $TLE_9$ and $TLE_3$ into TLEOI 1145(9,1)-(9,N) and TLEOI 1145(8,3)-(3,N), all as depicted in FIG. 11. Moreover, master tracklog 1050 now appears at master server 1020 as a master tracklog 1155. Master tracklog 1155, once the incremental backup depicted as incremental backup tracklog example 1100 has completed, includes TLE images reflecting the changes to backup images 1135 (depicted in FIG. 11, e.g., as TLE images 1165(1)-(10), which are referred to in the aggregate as TLE images 1165). As before, once a backup operation has completed, the backup image maintained at a given backup host for a given TLE (one of backup images 1135) and the TLE image maintained at master server 1020 for the given TLE (a corresponding one of TLE images 1165), should be the same. Moreover, it will again be appreciated that TLE object images that make up each of TLE images 1165, corresponding to individual ones of TLEOI 1145, are not shown in FIG. 11, again for the sake of simplicity. As noted earlier, maintenance of TLE images 1165 at master server 1020 allows ones of backup hosts to request the appropriate one(s) of TLE images 1165 (e.g., those becoming responsible for the processing of TLEs for which those backup hosts were not previously responsible, either by way of reassignment of the TLE(s) in question or with respect to one or more new TLEs).

Example Verification Processes

Figure 12:
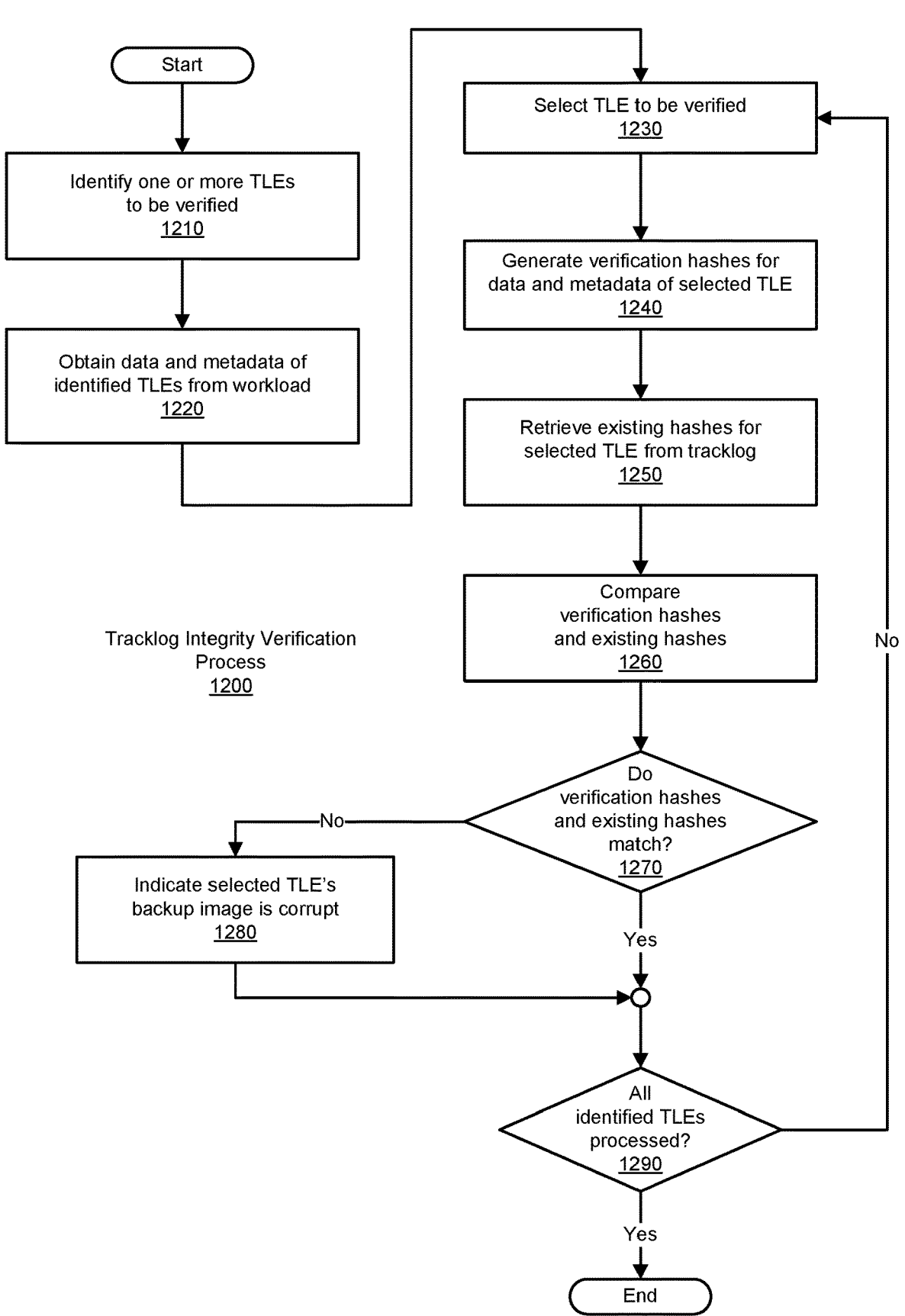
FIG. 12 is a flow diagram illustrating an example of a tracklog integrity verification process, according to embodiments of methods and systems such as those disclosed herein.

FIG. 12 is a flow diagram illustrating an example of a tracklog integrity verification process, according to embodiments of methods and systems such as those disclosed herein. FIG. 12 thus depicts a tracklog integrity verification process 1200. Tracklog integrity verification process 1200 begins with the identification of one or more TLEs that are to be verified (1210). Having identified the TLE(s) to be verified, tracklog integrity verification process 1200 proceeds with obtaining, for example, the data and metadata of the identified TLE(s), from the workload in question (1220). In terms of, for example, an architecture such as that depicted in FIG. 5, one of backup hosts 510 might obtain such data and metadata from workload 515. Next, one of the TLEs identified earlier is selected for verification (1230).

Verification hashes are generated for the data and metadata of the selected TLE (1240). Existing hashes for the selected TLE are retrieved from the TLE's tracklog (1250). The verification hashes generated and the existing hashes retrieved are compared (1260), and a determination made as to whether the verification hashes and the existing hashes match (1270). In the case in which the verification hashes an existing hashes do not match, the selected TLE is indicated as having a corrupt backup image (1280). As noted earlier herein, a TLE having corrupted information in its backup image can simply be included in the next backup performed, given that the TLE is treated as an atomic unit for purposes of methods and systems such as those described herein. At this juncture, whether or not the verification hashes and existing hashes match, tracklog integrity verification process 1200 proceeds with a determination as to whether all the identified TLEs have been processed (1290). If one or more TLEs remain to have their backup images verified, tracklog integrity verification process 1200 loops to the selection of the next TLE to be verified (1230). In the alternative, all identified TLEs having been processed, tracklog integrity verification process 1200 concludes.

FIG. 13 is a flow diagram illustrating an example of a the duplication store integrity verification process, according to embodiments of methods and systems such as those disclosed herein. FIG. 13 thus depicts a deduplication store integrity verification process 1300. The duplication store integrity verification process 1300 begins with the identification of one or more data segments to be verified (1310). Verification hashes are generated for the data segments thus identified (1320). The verification hashes generated are then sent to the appropriate deduplication storage system (1330). At this juncture, the duplication store integrity verification process 1300 awaits the receipt of verification information from the deduplication storage system. An example of a process for producing verification information from verification hashes is described in greater detail in connection with FIG. 14, subsequently. Communications with the deduplication storage system are noted in FIG. 13 by way of the connectors "A" and "B" depicted therein.

Subsequently, the resulting verification information for the data segments in question is received from the deduplication storage system (1340). TLEs having corrupt backup data segments are identified using the verification information received (1350). Affected TLEs are then marked as being subject to a full backup during the next backup operation (1360). Deduplication store integrity verification process 1300 then concludes.

Figure 14:
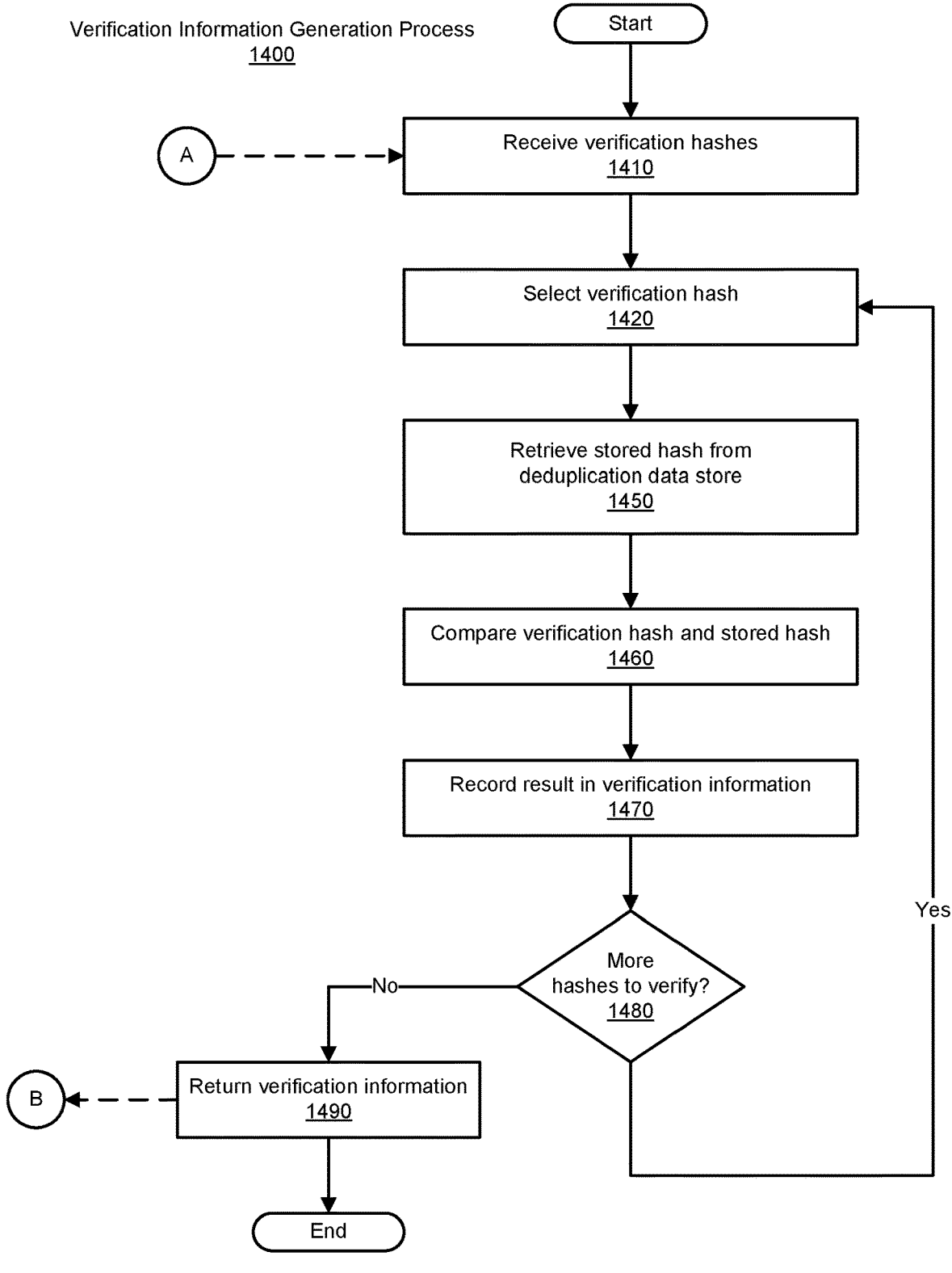
FIG. 14 is a flow diagram illustrating an example of a verification information generation process, according to embodiments of methods and systems such as those disclosed herein.

FIG. 14 is a flow diagram illustrating an example of a verification information generation process, according to embodiments of methods and systems such as those disclosed herein. FIG. 14 thus depicts a verification information generation process 1400. Verification information generation process 1400 begins with the receipt of one or more verification hashes, as noted in connection with connector "A" of FIG. 13 (1410). One of the verification hashes thus received is then selected (1420). Stored hash information is then retrieved from the deduplication data store (1430). The selected verification hash and the stored hash retrieved are then compared (1440). The result of this comparison is then recorded in the verification information (1450). A determination is then made as to whether additional verification hashes remain to be verified (1460). If verification hashes remain to be verified, verification information generation process 1400 loops to the selection of the next verification hash to be processed (1420). In the alternative, verification information generation process 1400 proceeds with returning the verification information thus generated, as noted in connection with connector "B" of FIG. 13 (1470). Verification information generation process 1400 then concludes.

An Example Computing and Network Environment

As noted, the systems described herein can be implemented using a variety of computer systems and networks. The following illustrates an example configuration of a computing device such as those described herein. The computing device may include one or more processors, a random access memory (RAM), communication interfaces, a display device, other input/output (I/O) devices (e.g., keyboard, trackball, and the like), and one or more mass storage devices (e.g., optical drive (e.g., CD, DVD, or Blu-ray), disk drive, solid state disk drive, non-volatile memory express (NVME) drive, or the like), configured to communicate with each other, such as via one or more system buses or other suitable connections. While a single system bus is illustrated for ease of understanding, it should be understood that the system buses may include multiple buses, such as a memory device bus, a storage device bus (e.g., serial ATA (SATA) and the like), data buses (e.g., universal serial bus (USB) and the like), video signal buses (e.g., ThunderBolt®, DVI, HDMI, and the like), power buses, or the like.

Such CPUs are hardware devices that may include a single processing unit or a number of processing units, all of which may include single or multiple computing units or multiple cores. Such a CPU may include a graphics processing unit (GPU) that is integrated into the CPU or the GPU may be a separate processor device. The CPU may be implemented as one or more microprocessors, microcomputers, microcontrollers, digital signal processors, central processing units, graphics processing units, state machines, logic circuitries, and/or any devices that manipulate signals based on operational instructions. Among other capabilities, the CPU may be configured to fetch and execute computer-readable instructions stored in a memory, mass storage device, or other computer-readable storage media.

Memory and mass storage devices are examples of computer storage media (e.g., memory storage devices) for storing instructions that can be executed by the processors 502 to perform the various functions described herein. For example, memory can include both volatile memory and non-volatile memory (e.g., RAM, ROM, or the like) devices. Further, mass storage devices may include hard disk drives, solid-state drives, removable media, including external and removable drives, memory cards, flash memory, floppy disks, optical disks (e.g., CD, DVD, Blu-ray), a storage array, a network attached storage, a storage area network, or the like. Both memory and mass storage devices may be collectively referred to as memory or computer storage media herein and may be any type of non-transitory media capable of storing computer-readable, processor-executable program instructions as computer program code that can be executed by the processors as a particular machine configured for carrying out the operations and functions described in the implementations herein.

The computing device may include one or more communication interfaces for exchanging data via a network. The communication interfaces can facilitate communications within a wide variety of networks and protocol types, including wired networks (e.g., Ethernet, DOCSIS, DSL, Fiber, USB, or the like) and wireless networks (e.g., WLAN, GSM, CDMA, 802.11, Bluetooth, Wireless USB, ZigBee, cellular, satellite, or the like), the Internet and the like. Communication interfaces can also provide communication with external storage, such as a storage array, network attached storage, storage area network, cloud storage, or the like.

The display device may be used for displaying content (e.g., information and images) to users. Other I/O devices may be devices that receive various inputs from a user and provide various outputs to the user, and may include a keyboard, a touchpad, a mouse, a printer, audio input/output devices, and so forth. The computer storage media, such as memory 504 and mass storage devices, may be used to store software and data, such as, for example, an operating system, one or more drivers (e.g., including a video driver for a display such as display 150), one or more applications, and data. Examples of such computing and network environments are described below with reference to FIGS. 15 and 16.

Figure 15:
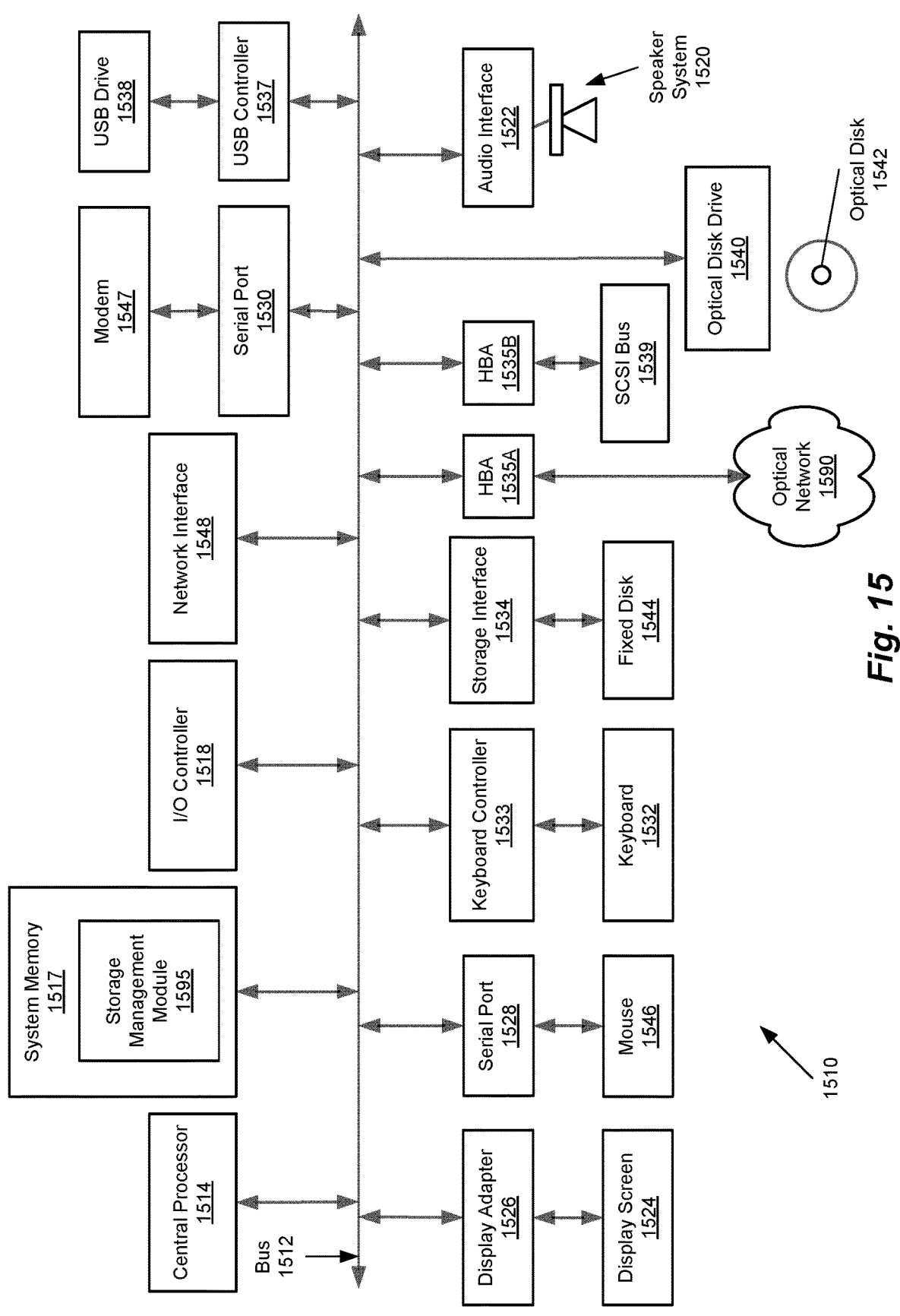
FIG. 15 is a simplified block diagram illustrating components of an example computer system suitable for implementing embodiments of the present disclosure, according to embodiments of methods and systems such as those disclosed herein.

FIG. 15 depicts a block diagram of a computer system 1510 suitable for implementing aspects of the systems described herein. Computer system 1510 includes a bus 1512 which interconnects major subsystems of computer system 1510, such as a central processor 1514, a system memory 1517 (typically RAM, but which may also include ROM, flash RAM, or the like), an input/output controller 1518, an external audio device, such as a speaker system 1520 via an audio output interface 1522, an external device, such as a display screen 1524 via display adapter 1526, serial ports 1528 and 1530, a keyboard 1532 (interfaced with a keyboard controller 1533), a storage interface 1534, a USB controller 1537 operative to receive a USB drive 1538, a host bus adapter (HBA) interface card 1535A operative to connect with a optical network 1590, a host bus adapter (HBA) interface card 1535B operative to connect to a SCSI bus 1539, and an optical disk drive 1540 operative to receive an optical disk 1542. Also included are a mouse 1546 (or other point-and-click device, coupled to bus 1512 via serial port 1528), a modem 1547 (coupled to bus 1512 via serial port 1530), and a network interface 1548 (coupled directly to bus 1512).

Bus 1512 allows data communication between central processor 1514 and system memory 1517, which may include read-only memory (ROM) or flash memory (neither shown), and random access memory (RAM) (not shown), as previously noted. RAM is generally the main memory into which the operating system and application programs are loaded. The ROM or flash memory can contain, among other code, the Basic Input-Output System (BIOS) which controls basic hardware operation such as the interaction with peripheral components. Applications resident with computer system 1510 are generally stored on and accessed from a computer-readable storage medium, such as a hard disk drive (e.g., fixed disk 1544), an optical drive (e.g., optical drive 1540), a universal serial bus (USB) controller 1537, or other computer-readable storage medium.

Storage interface 1534, as with the other storage interfaces of computer system 1510, can connect to a standard computer-readable medium for storage and/or retrieval of information, such as a fixed disk drive 1544. Fixed disk drive 1544 may be a part of computer system 1510 or may be separate and accessed through other interface systems. Modem 1547 may provide a direct connection to a remote server via a telephone link or to the Internet via an internet service provider (ISP). Network interface 1548 may provide a direct connection to a remote server via a direct network link to the Internet via a POP (point of presence). Network interface 1548 may provide such connection using wireless techniques, including digital cellular telephone connection, Cellular Digital Packet Data (CDPD) connection, digital satellite data connection or the like. Also depicted as part of computer system 1510 is a storage management module 1595, which is resident in system memory 1517 and provides functionality and operations comparable to the storage management processes described herein.

Many other devices or subsystems (not shown) may be connected in a similar manner (e.g., document scanners, digital cameras and so on). Conversely, all of the devices shown in FIG. 15 need not be present to practice the systems described herein. The devices and subsystems can be interconnected in different ways from that shown in FIG. 15. The operation of a computer system such as that shown in FIG. 15 will be readily understood in light of the present disclosure. Code to implement portions of the systems described herein can be stored in computer-readable storage media such as one or more of system memory 1517, fixed disk 1544, optical disk 1542, or USB drive 1538. The operating system provided on computer system 1510 may be WINDOWS, UNIX, LINUX, IOS, or other operating system.

Moreover, regarding the signals described herein, those skilled in the art will recognize that a signal can be directly transmitted from a first block to a second block, or a signal can be modified (e.g., amplified, attenuated, delayed, latched, buffered, inverted, filtered, or otherwise modified) between the blocks. Although the signals of the above described embodiment are characterized as transmitted from one block to the next, other embodiments may include modified signals in place of such directly transmitted signals as long as the informational and/or functional aspect of the signal is transmitted between blocks. To some extent, a signal input at a second block can be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

Figure 16:
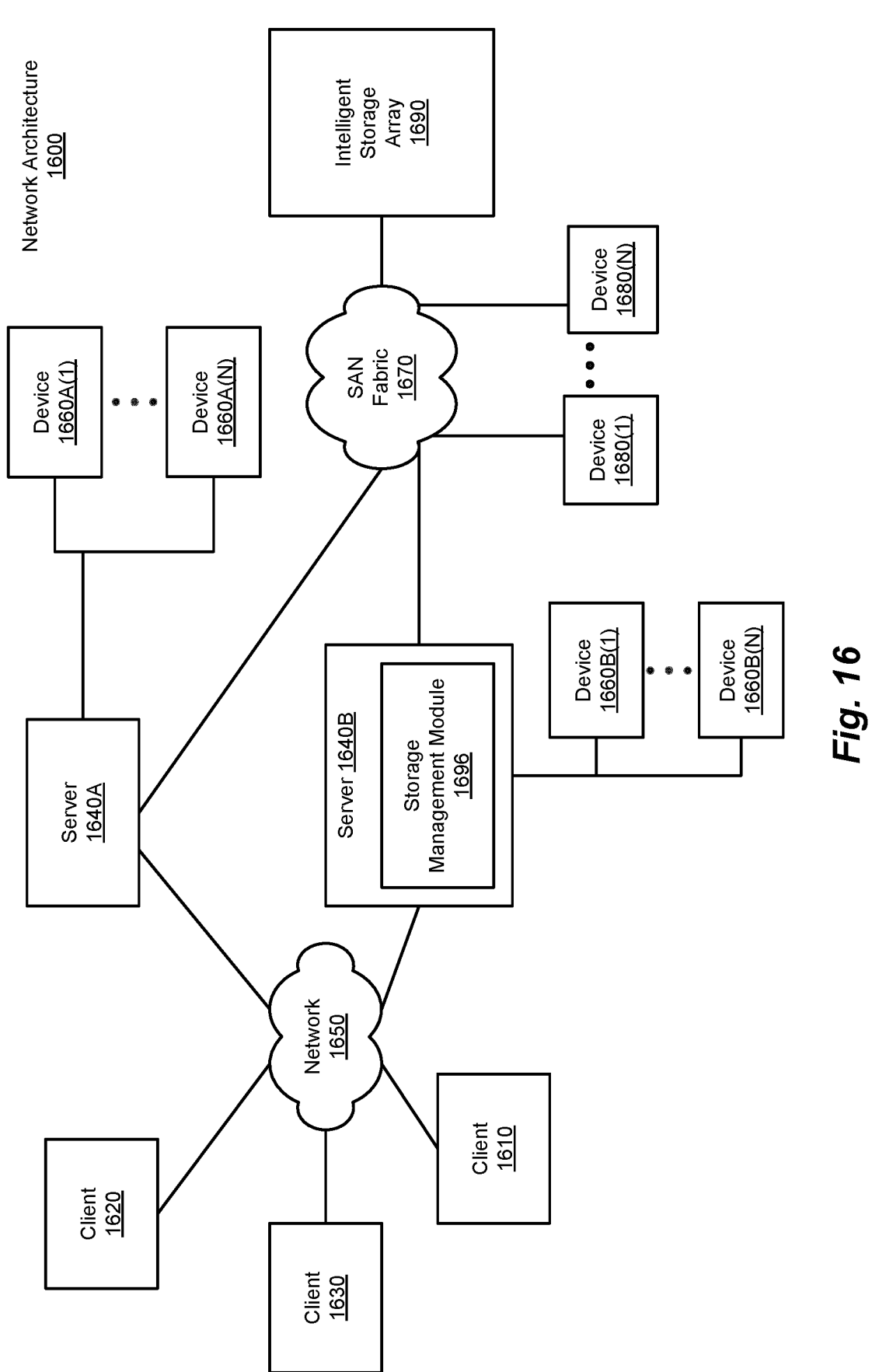
FIG. 16 is a simplified block diagram illustrating components of an example computer system suitable for implementing embodiments of the present disclosure, according to embodiments of methods and systems such as those disclosed herein.

FIG. 16 is a block diagram depicting a network architecture 1600 in which client systems 1610, 1620 and 1630, as well as storage servers 1640A and 1640B (any of which can be implemented using computer system 1610), are coupled to a network 1650. Storage server 1640A is further depicted as having storage devices 1660A(1)-(N) directly attached, and storage server 1640B is depicted with storage devices 1660B(1)-(N) directly attached. Storage servers 1640A and 1640B are also connected to a SAN fabric 1670, although connection to a storage area network is not required for operation. SAN fabric 1670 supports access to storage devices 1680(1)-(N) by storage servers 1640A and 1640B, and so by client systems 1610, 1620 and 1630 via network 1650. An intelligent storage array 1690 is also shown as an example of a specific storage device accessible via SAN fabric 1670.

Also depicted as part of network architecture 1600 is a storage management module 1696 (installed in server 1640B), which is comparable in function and operation to various of the storage management modules described earlier herein. For example, using the components depicted earlier, storage management module 1696 can provide functionality associated with the management of data, as depicted in and described in connection therewith.

With reference to computer system 1510, modem 1547, network interface 1548 or some other method can be used to provide connectivity from each of client computer systems

1610, 1620 and 1630 to network 1650. Client systems 1610, 1620 and 1630 are able to access information on storage server 1640A or 1640B using, for example, a web browser or other client software (not shown). Such a client allows client systems 1610, 1620 and 1630 to access data hosted by storage server 1640A or 1640B or one of storage devices 1660A(1)-(N), 1660B(1)-(N), 1680(1)-(N) or intelligent storage array 1690. FIG. 16 depicts the use of a network such as the Internet for exchanging data, but the systems described herein are not limited to the Internet or any particular network-based environment.

Other Embodiments

The example systems and computing devices described herein are well adapted to attain the advantages mentioned as well as others inherent therein. While such systems have been depicted, described, and are defined by reference to particular descriptions, such references do not imply a limitation on the claims, and no such limitation is to be inferred. The systems described herein are capable of considerable modification, alteration, and equivalents in form and function, as will occur to those ordinarily skilled in the pertinent arts in considering the present disclosure. The depicted and described embodiments are examples only, and are in no way exhaustive of the scope of the claims.

Such example systems and computing devices are merely examples suitable for some implementations and are not intended to suggest any limitation as to the scope of use or functionality of the environments, architectures and frameworks that can implement the processes, components and features described herein. Thus, implementations herein are operational with numerous environments or architectures, and may be implemented in general purpose and special-purpose computing systems, or other devices having processing capability. Generally, any of the functions described with reference to the figures can be implemented using software, hardware (e.g., fixed logic circuitry) or a combination of these implementations. The term "module," "mechanism" or "component" as used herein generally represents software, hardware, or a combination of software and hardware that can be configured to implement prescribed functions. For instance, in the case of a software implementation, the term "module," "mechanism" or "component" can represent program code (and/or declarative-type instructions) that performs specified tasks or operations when executed on a processing device or devices (e.g., CPUs or processors). The program code can be stored in one or more computer-readable memory devices or other computer storage devices. Thus, the processes, components and modules described herein may be implemented by a computer program product.

The foregoing thus describes embodiments including components contained within other components (e.g., the various elements shown as components of computer system 1510). Such architectures are merely examples, and, in fact, many other architectures can be implemented which achieve the same functionality. In an abstract but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermediate components. Likewise, any two components so associated can also be viewed as being "operably connected," or "operably coupled," to each other to achieve the desired functionality.

Furthermore, this disclosure provides various example implementations, as described and as illustrated in the drawings. However, this disclosure is not limited to the implementations described and illustrated herein, but can extend to other implementations, as would be known or as would become known to those skilled in the art. Reference in the specification to "one implementation," "this implementation," "these implementations" or "some implementations" means that a particular feature, structure, or characteristic described is included in at least one implementation, and the appearances of these phrases in various places in the specification are not necessarily all referring to the same implementation. As such, the various embodiments of the systems described herein via the use of block diagrams, flowcharts, and examples. It will be understood by those within the art that each block diagram component, flowchart step, operation and/or component illustrated by the use of examples can be implemented (individually and/or collectively) by a wide range of hardware, software, firmware, or any combination thereof.

The systems described herein have been described in the context of fully functional computer systems; however, those skilled in the art will appreciate that the systems described herein are capable of being distributed as a program product in a variety of forms, and that the systems described herein apply equally regardless of the particular type of computer-readable media used to actually carry out the distribution. Examples of computer-readable media include computer-readable storage media, as well as media storage and distribution systems developed in the future.

The above-discussed embodiments can be implemented by software modules that perform one or more tasks associated with the embodiments. The software modules discussed herein may include script, batch, or other executable files. The software modules may be stored on a machine-readable or computer-readable storage media such as magnetic floppy disks, hard disks, semiconductor memory (e.g., RAM, ROM, and flash-type media), optical discs (e.g., CD-ROMs, CD-Rs, and DVDs), or other types of memory modules. A storage device used for storing firmware or hardware modules in accordance with an embodiment can also include a semiconductor-based memory, which may be permanently, removably or remotely coupled to a microprocessor/memory system. Thus, the modules can be stored within a computer system memory to configure the computer system to perform the functions of the module. Other new and various types of computer-readable storage media may be used to store the modules discussed herein.

In light of the foregoing, it will be appreciated that the foregoing descriptions are intended to be illustrative and should not be taken to be limiting. As will be appreciated in light of the present disclosure, other embodiments are possible. Those skilled in the art will readily implement the steps necessary to provide the structures and the methods disclosed herein, and will understand that the process parameters and sequence of steps are given by way of example only and can be varied to achieve the desired structure as well as modifications that are within the scope of the claims. Variations and modifications of the embodiments disclosed herein can be made based on the description set forth herein, without departing from the scope of the claims, giving full cognizance to equivalents thereto in all respects.

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

What is claimed is:

1. A computer-implemented method, implemented in a computer system, comprising:
   generating representational information, wherein the representational information is based, at least in part, on at least a portion of information of a top-level entity that includes a plurality of objects which include at least one new data segment or at least one modified data segment;
   retrieving a stored representational information, wherein:
      the stored representational information is based, at least in part, on the at least the portion of the information of the top-level entity,
      the stored representational information is retrieved from log information produced as part of a backup operation, and
      the backup operation produced a backup image of the top-level entity;
   determining whether the representational information and the stored representational information match, wherein the representational information comprises an INLINE directive and the at least one new data segment or the at least one modified data segment; and
   in response to a determination that the representational information and the stored representational information do not match, indicating that the backup image of the top-level entity is corrupt.

2. The method of claim 1, wherein the top-level entity comprises a plurality of objects, the computer system implements a backup host, and the computer-implemented method further comprises:
   requesting one or more objects of the plurality of objects from a workload, wherein
      the backup host and the workload are in communication with one another; and
   receiving the one or more objects at the backup host, wherein
      the information of the top-level entity comprises the one or more objects.

3. The method of claim 2, wherein
   the backup image of the top-level entity is generated from a backup stream, and
   the backup stream is assigned to the backup host, which backs up the backup stream into the backup image of the top-level entity.

4. The method of claim 3, wherein
   the backup host is one of a plurality of backup hosts,
   the backup stream comprises information regarding each object of the plurality of objects, and
   the backup host backs up the information regarding each object of the plurality of objects into the backup image of the top-level entity.

5. The method of claim 1, wherein
   the top-level entity is a container,
   the container of one of a plurality of containers,
   the log information is a tracklog that is one of a plurality of tracklogs, each of which corresponds to a corresponding backup stream of a plurality of backup streams, and the backup image of the top-level entity is the backup stream of the plurality of backup streams that corresponds to the tracklog.

6. The method of claim 1, further comprising:
identifying one or more top-level entities, wherein
the one or more top-level entities comprise the top-level entity; and
for each top-level entity of the one or more top-level entities,
obtaining metadata of each top-level entity, and
performing the generating the representational information for the each top-level entity, using the metadata of each top-level entity.

7. The method of claim 6, further comprising:
for each top-level entity of the one or more top-level entities,
obtaining data of each top-level entity,
obtaining added/modified/deleted information for each top-level entity, and performing the generating the representational information for the each top-level entity, using the data of each top-level entity, the metadata of each top-level entity, and the added/modified/deleted information for each top-level entity.

8. The method of claim 7, wherein the top-level entity comprises a plurality of objects, the added/modified/deleted information for each top-level entity comprises added/modified/deleted information for each object of the plurality of objects, and the computer-implemented method further comprises:
retrieving stored added/modified/deleted information for each object of top-level entity from a workload;
determining whether the added/modified/deleted information for each object of the plurality of objects and the stored added/modified/deleted information for each object of top-level entity match; and
in response to a determination that the added/modified/deleted information for each object of the plurality of objects and the stored added/modified/deleted information for each object of top-level entity do not match, performing the indicating that the backup image of the top-level entity is corrupt.

9. The method of claim 1, wherein
the top-level entity comprises a plurality of objects,
the log information is a tracklog that maintains a tuple for each object of the plurality of objects, and
the tuple for each object of the plurality of objects comprises
an object identifier, and
object metadata.

10. The method of claim 9, wherein the generating the representational information comprises:
performing a hash operation on the object identifier of a tuple of an object of the plurality of objects; and
performing the hash operation on the object metadata of the tuple of the object of the plurality of objects.

11. The method of claim 1, wherein the top-level entity comprises a plurality of objects, and the computer-implemented method further comprises:
discarding the backup image of the top-level entity, wherein
the backup image of the top-level entity is corrupt as a result of a failure in the backup operation, corruption of a token or delta link representing an incremental backup image of one or more objects of the top-level entity, or corruption of the one or more objects of the top-level entity; and generating another backup image of the top-level entity by performing the backup operation only as to the top-level entity.

12. The method of claim 1, further comprising:
in response to an indication that the backup image of the top-level entity is corrupt,
obtaining a prior incremental backup image of the top-level entity, wherein
the backup operation is an incremental backup operation,
the backup image of the top-level entity is an incremental backup image of the top-level entity,
the prior incremental backup image of the top-level entity was generated by a prior incremental backup operation, and
the prior incremental backup operation was performed prior to the incremental backup operation.

13. The method of claim 1, wherein the top-level entity is one of a plurality of top-level entities, the computer system implements a backup host of a plurality of backup hosts, and the computer-implemented method further comprises:
assigning each of the plurality of top-level entities to a corresponding one of the plurality of backup hosts; and
generating a corresponding backup stream at the corresponding one of a plurality of backup hosts by causing the corresponding one of the plurality of backup hosts to
perform a corresponding backup operation on the each of the plurality of top-level entities.

14. The method of claim 13, further comprising:
reassigning one or more of the each of the plurality of top-level entities from the corresponding one of the plurality of backup hosts to another corresponding one of the plurality of backup hosts; and
generating another corresponding backup stream at the another corresponding one of the plurality of backup hosts by causing the another corresponding one of the plurality of backup hosts to perform another corresponding backup operation on the one or more of the each of the plurality of top-level entities.

15. The method of claim 1, wherein
the top-level entity comprises a plurality of objects,
the plurality of objects are stored in a container, and
the top-level entity is one of
one or more files of a user account,
an electronic mail account,
a virtual disk, or
a virtual machine.

16. A non-transitory computer-readable storage medium, comprising program instructions, which, when executed by one or more processors of a computing system, perform a method comprising:
generating representational information, wherein the representational information is based, at least in part, on at least a portion of information of a top-level entity that includes a plurality of objects which include at least one new data segment or at least one modified data segment;
retrieving a stored representational information, wherein
the stored representational information is based, at least in part, on the at least the portion of the information of the top-level entity,
the stored representational information is retrieved from log information produced as part of a backup operation, and
the backup operation produced a backup image of the top-level entity;

determining whether the representational information and the stored representational information match, wherein the representational information comprises an INLINE directive and the at least one new data segment or the at least one modified data segment; and in response to a determination that the representational information and the stored representational information do not match, indicating that the backup image of the top-level entity is corrupt.

17. The non-transitory computer-readable storage medium of claim 16, wherein the top-level entity comprises a plurality of objects, the computer system implements a backup host, and the method further comprises:

requesting one or more objects of the plurality of objects from a workload, wherein the backup host and the workload are in communication with one another; and receiving the one or more objects at the backup host, wherein the information of the top-level entity comprises the one or more objects.

18. The non-transitory computer-readable storage medium of claim 16, wherein the method further comprises:

identifying one or more top-level entities, wherein the one or more top-level entities comprise the top-level entity; and for each top-level entity of the one or more top-level entities, obtaining metadata of each top-level entity, and performing the generating the representational information for each top-level entity, using the metadata of each top-level entity.

19. The non-transitory computer-readable storage medium of claim 16, wherein the top-level entity is one of a plurality of top-level entities, the computer system implements a backup host of a plurality of backup hosts, and the method further comprises:

assigning each of the plurality of top-level entities to a corresponding one of the plurality of backup hosts;

generating a corresponding backup stream at the corresponding one of a plurality of backup hosts by causing the corresponding one of the plurality of backup hosts to perform a corresponding backup operation on each of the plurality of top-level entities;

reassigning one or more of each of the plurality of top-level entities from the corresponding one of the plurality of backup hosts to another corresponding one of the plurality of backup hosts; and generating another corresponding backup stream at the another corresponding one of the plurality of backup hosts by causing the another corresponding one of the plurality of backup hosts to perform another corresponding backup operation on the one or more of the plurality of top-level entities.

20. A computing system comprising:

one or more processors; and a computer-readable storage medium coupled to the one or more processors, comprising program instructions, which, when executed by the one or more processors, perform a method comprising generating representational information, wherein the representational information is based, at least in part, on at least a portion of information of a top-level entity that includes a plurality of objects which include at least one new data segment or at least one modified data segment, retrieving a stored representational information, wherein the stored representational information is based, at least in part, on the at least the portion of the information of the top-level entity, the stored representational information is retrieved from log information produced as part of a backup operation, and the backup operation produced a backup image of the top-level entity, determining whether the representational information and the stored representational information match, wherein the representational information comprises an INLINE directive and the at least one new data segment or the at least one modified data segment, and in response to a determination that the representational information and the stored representational information do not match, indicating that the backup image of the top-level entity is corrupt.

* * * * *